US006994913B1

(12) United States Patent
Niki et al.

(10) Patent No.: US 6,994,913 B1
(45) Date of Patent: Feb. 7, 2006

(54) THERMOPLASTIC ELASTOMER, USE THEREOF, AND PROCESS FOR PRODUCING THE SAME

(75) Inventors: Akihiro Niki, Mishima-gun (JP); Hirotake Matsumoto, Mishima-gun (JP); Akihiko Fujiwara, Mishima-gun (JP); Yasuhiro Nakatani, Mishima-gun (JP); Shoji Nozato, Mishima-gun (JP)

(73) Assignee: Sekisui Chemical Co., Ltd., Osaka (JP)

( * ) Notice: Subject to any disclaimer, the term of this patent is extended or adjusted under 35 U.S.C. 154(b) by 454 days.

(21) Appl. No.: 10/089,044

(22) PCT Filed: Sep. 29, 2000

(86) PCT No.: PCT/JP00/06812

§ 371 (c)(1),
(2), (4) Date: Jul. 10, 2002

(87) PCT Pub. No.: WO01/23458

PCT Pub. Date: Apr. 5, 2001

(30) Foreign Application Priority Data

Sep. 30, 1999 (JP) .............................. 11/280305
Aug. 2, 2000 (JP) .............................. 2000/234525
Aug. 10, 2000 (JP) .............................. 2000/242823

(51) Int. Cl.
*B32B 27/36* (2006.01)
*C08G 63/66* (2006.01)
*C08G 18/42* (2006.01)

(52) U.S. Cl. .................. 428/480; 428/423.1; 428/364; 428/365; 428/394; 525/437; 525/440; 525/453

(58) Field of Classification Search ................ 525/437, 525/440, 453; 428/423.1, 364, 365, 394, 428/480
See application file for complete search history.

(56) References Cited

U.S. PATENT DOCUMENTS

| 3,687,715 A | 8/1972 | Kigane et al. | |
| 3,935,132 A * | 1/1976 | Gerkin et al. | 521/54 |
| 5,441,808 A * | 8/1995 | Anderson et al. | 428/349 |
| 5,527,835 A * | 6/1996 | Shustack | 522/42 |
| 5,811,506 A * | 9/1998 | Slagel | 528/64 |
| 5,863,972 A | 1/1999 | Beckelmann et al. | |
| 6,258,917 B1 * | 7/2001 | Slagel | 528/64 |

FOREIGN PATENT DOCUMENTS

| EP | 102115 | 3/1984 |
| EP | 0 11 360 | 6/1984 |
| GB | 1 578 930 | 11/1980 |
| JP | 52-121699 | 10/1977 |
| JP | 57-133032 | 8/1982 |
| JP | 59-111847 | 6/1984 |
| JP | 62-290714 | 12/1987 |
| JP | 2-88632 | 3/1990 |
| JP | 2-215821 | 8/1990 |
| JP | 5-317411 | 12/1993 |
| JP | 5-337164 | 12/1993 |
| JP | 6-49169 | 2/1994 |
| JP | 8-311233 | 11/1996 |
| JP | 9-13277 | 1/1997 |
| JP | 10-17764 | 1/1998 |
| JP | 11-124774 | 5/1999 |
| JP | 2000-212406 | 8/2000 |

OTHER PUBLICATIONS

English Translation of JP 02-215821 Yamaguchi et al. Aug. 1990.*
Machine Translation of JP10-017764, obtained from the JPO web-site Jan. 1998.*

* cited by examiner

*Primary Examiner*—Jeffrey B. Robertson
(74) *Attorney, Agent, or Firm*—Wenderoth, Lind & Ponack, L.L.P.

(57) ABSTRACT

The present invention presents a thermoplastic elastomer that exhibits superior moisture permeability, excellent flexibility and mechanical properties at a high temperature, particularly settling resistance at a high temperature, and excellent moisture permeability. The thermoplastic elastomer includes, as a constituting unit, a polyether component (A) and a polyester component (B), wherein the polyether component (A) includes poly-oxyalkylene groups ($-C_nH_{2n}O-$) having a carbon/oxygen atomic ratio in a range from 2.0 to 2.5, the polyester component (B) has a number-average molecular weight in a range from 500 to 10,000, the thermoplastic elastomer has a content of polyether component (A) in a range from 50 to 95 weight %, and the thermoplastic elastomer has a glass transition temperature of not more than $-20°$ C.

24 Claims, No Drawings

THERMOPLASTIC ELASTOMER, USE THEREOF, AND PROCESS FOR PRODUCING THE SAME

This application is a 371 of PCT/JP00/06812 filed Sep. 29, 2000.

BACKGROUND OF THE INVENTION

1. Technical Field

The present invention relates to a thermoplastic elastomer comprising a polyether component (A) as its constituting unit, and to a production method thereof. The present invention also relates to a fiber made from said thermoplastic elastomer possessing excellent water absorption and moisture-releasing property, and to a fabric made from said fiber.

More particularly, the present invention relates to an elastomer sheet possessing excellent moisture permeability and cut-off performance made from a thermoplastic elastomer comprising a polyether component (A) as its constituting unit, and to a production method thereof.

The present invention also relates to a moisture permeable waterproofing fabric possessing excellent moisture permeability and waterproofing property simultaneously, and to clothes, tents, and shoes that are made from said fabric.

The present invention also relates to a molded product, which is employed in the fields of medical treatment, hygiene, or pharmaceuticals. More particularly the present invention relates to a molded product for medical use, for example, containers such as infusion bags or blood transfusion bags, and the like; tubes used for infusion set, blood transfusion system, or catheter; or injection-molding parts such as stoppers thereof.

2. Background Art

In recent years the notion toward preservation of the environment has been raised, and which results in accelerating replacement of existent raw materials with recyclable ones in various industrial fields. With regard to the rubber materials, thermoplastic elastomers (TPE) have been the focus of attention for a long period, and are employed in the field of various industrial products for various applications.

Among them, thermoplastic polyester elastomers (TPEE) are known to possess excellent mechanical strength, heat resistance, abrasion resistance, and bending-fatigue resistance, and have been used in a wide industrial field such as the field of automobiles.

The thermoplastic polyester elastomer (TPEE) is roughly classified into the polyester-polyether type and the polyester—polyester type, the former of which is the present mainstream.

Polyester-polyether elastomers are obtained from the ester-interchange reaction followed by the condensation reaction under vacuum using, for example, dimethyl terephthalate, 1,4-butanediol, and poly-tetramethylene glycol as the starting materials.

In more detail, they are multi-block copolymers made from the hard segment comprising condensation product of 1,4-butanediol and terephthalic acid, and the soft segment comprising condensation product of polytetramethylene glycol and terephthalic acid.

Such thermoplastic polyester elastomers usually have high stiffness compared with ordinary rubber, and are devoid of flexibility. In addition, they exhibit large permanent compression strain under high temperatures and large deformation, thus they are devoid of settling resistance. These defects have long been expected of better modification.

In adding further flexibility to thermoplastic polyester elastomers, it is necessary to reduce the amount of hard segment component that takes charge of physical cross-linking. An existent technique such as disclosed in Japanese Patent Publication for Laid-Open 88632/1990, however, decreased the block property of the hard segment component causing problems such as lowered melting point and inferior mechanical strength at high temperatures.

Concerning the settling resistance, as is disclosed in Japanese Patent Publication for Laid-Open 121699/1977, another technique which improves the settling resistance by raising the polymerization degree. But it had its limitations, and compatibility of settling resistance and flexibility was difficult to obtain.

On the other hand in the field of sanitary products or fabrics, raw materials with excellent moisture permeability are the present focus of attention. As is disclosed in Japanese Patent Publication for Laid-Open 111847/1984, the moisture permeability may be improved by specifying the composition and the amount of soft segment.

Also, as is disclosed in Japanese Patent Publication for Laid-Open 290714/1987, thermoplastic urethane elastomers are known to possess excellent moisture permeability. However, the moisture permeability of these existent materials is still insufficient and a further improvement is desired. Besides, in the case of urethane resins made from para-phenylene-diisocyanate, which is used very frequently, the product discolorates under the radiation of light. This also remains a point to be improved.

There have been many assiduous investigations concerning alternative use of polyester resins instead of polyurethane resins for production of composite sheets. Since polyester resins, however, usually show low solubility in various solvents compared with polyurethane resins, there are the restrictions to the processing method in actual application. In Japanese Patent Publication for Laid-Open 311233/1996, a method of applying a solution of polyester elastomers on a base material with heating, followed by solidifying under cooling and wet-forming the film to obtain a porous film is disclosed.

Fibers made from raw materials that have excellent water absorption and moisture-releasing property are known to exhibit superior sweat absorption as well as excellent treatment of sweat in, and to provide fabrics having dry touch and are smooth.

In the past, polyurethane elastomer fibers have been used as the elastomer fibers. In recent years, however, new polyester elastomer fibers have been the focus of attention, which are made from the hard segment comprising highly crystalline polyester such as polyethylene terephthalate or poly-butylene terephthalate, and the soft segment comprising polyalkylene glycol such as polytetramethylene glycol. However, these materials are still hydrophobic, and accordingly show limited moisture absorption in a fabric form. Thus it was impossible to provide a fabric with dry touch.

As a raw material with excellent water absorption and moisture-releasing property, Japanese Patent Publication for Laid-Open 111847/1984 discloses a ester elastomer having excellent water absorption and moisture-releasing property, which is produced by specifying the composition and amount of the soft segment. Also Japanese Patent Publication for Laid-Open 290714/1987 discloses a novel thermoplastic urethane elastomer. All these products, however, exhibited unsatisfactory moisture absorption and drying property.

The thermoplastic polyester elastomers are also known to be used for films or sheets. (see Japanese Patent Publication for Laid-Open 133032/1982.) Such films or sheets still leave room for improvement about flexibility, and are difficult to provide the products to some fields that really need for the elastic property. Overall in the past, a practically usable film or sheet was unobtainable, which can exhibit sufficient mechanical properties such as strength or flexibility or the like as well as satisfactory heat resistance simultaneously.

The fabrics that possess moisture permeability and water proofing property simultaneously can release steam due to sweat of bodies from the fabrics yet prevent penetration of rain into the fabrics. In order to add such functions, coating or lamination of polyamino acid urethane resins, polyurethane resins, or polytetrafluoroethylene resins on a fabric is well-known.

A fabric coated with ordinary polyurethane resins has shown a defect of steamy feeling in wearing fabrics due to its inferior moisture permeability. In order to solve the problem, proposed is a method of applying a mixture of polyurethane resins and hygroscopic charcoal powders on a fabric. (Japanese Japanese Patent Publication for Laid-Open 13277/1997.) A fabric laminated with micro-porous film of polytetrafluoroethylene shows excellent moisture permeability and waterproofing property. But the micro-pore is easily stuffed up with dusts leading to the inferior moisture permeability. The produced fabrics feel hard, thus are not suited for practical use, especially for fabrics, but the applications are not limited.

Molded products of plastic resins have long been employed in a wide field of medical treatment, hygiene, or pharmaceuticals. They have been used largely as they are light-weight and free from damages compared with metals and glass, can be molded into various shapes such as film or tube, and can be applied to disposable application due to their rather inexpensive costs. Concerning their physical characteristics, durability at sterilization treatment such as steam sterilization under high pressures, radiation sterilization, or sterilization using ethylene oxide is required. The easiness of treating waste is also required. In addition, the transparency of the base material is needed in some uses.

Polyethylene plastic resins have generally excellent impact resistance, flexibility, and transparency, but do not endure high pressure steam sterilization individually at not less than 110° C. owing to their low melting points. For the reason, it becomes necessary to lower the temperature of sterilization and to prolong the sterilization time accordingly. High-density modification of the resin improves the heat resistance, but, on the other hand, sacrifices transparency or flexibility instead.

Polypropylene resins exhibit higher softening points and heat resistance compared with polyethylene resins. But they often lack enough flexibility and impact strength especially at low temperatures, when used alone, for soft bags, films, or tubes due to their rather high modulus of elasticity. Therefore, they are generally employed as blends with other soft resins or elastomer resins, or multi-laminated molded products.

EVA (Ethylene-Vinyl Acetate) copolymers have excellent transparency and flexibility, but show inferior heat resistance. Besides they frequently cause bleed-out of the acetate component by heating or sterilization. In order to obtain heat resistance, it is necessary to add a process of cross-linking using radiation of electron beam.

In order to solve these problems, Japanese Patent Publication for Laid-Open 337164/1993 and Japanese Patent Publication for Laid-Open 317411/1993 disclose medical materials using various cyclic polyolefin resins such as norbornene resins or cross-linked cyclic polyolefin resins.

With regard to PVC resins, they generate dioxins, which has a bad influence on the environment at disposal, thus there is a hesitation to use it.

DISCLOSURE OF INVENTION

The present invention has been devised in view of the above-listed problems. Its first object is to provide thermoplastic elastomers that have excellent moisture permeability and light resistance, and to provide a production method thereof. The second object is to provide thermoplastic elastomers that have a high block property for their hard segment components and soft segment components, and that have excellent flexibility and mechanical strength, especially excellent properties such as settling resistance at high temperatures, and moisture permeability, processing ability for painting solution, or light resistance and to provide a production method thereof.

Thus the present invention has its object of providing fibers made from thermoplastic elastomers with excellent moisture permeability and moisture-releasing property, and fabrics made from said fibers.

In view of the above problems in the existent technique, the present invention also aims at providing films or sheets that have excellent moisture permeability, waterproofing property, and flexibility.

In view of the above problems in the existent techniques, more particularly, the present invention aims at providing fabric with excellent moisture permeability, waterproofing property, and dressing feeling and further aims at provision of fabrics, tents, and shoes with comfortable feeling that are made from such materials.

The present invention aims at providing molded products for medical treatment made from thermoplastic elastomers that have excellent flexibility, heat resistance, sterilization resistance, and facile processing ability for steam sterilization. Particularly the present invention aims at providing containers such as infusion bags; tubes used for infusion set, blood transfusion system, or catheter; and injection molded parts such as stoppers thereof.

Note that the moisture permeability in the present invention is defined as a phenomenon in which the moisture is absorbed into one side of an object, and released from the other side of the object.

Namely the Present Invention Relates to:

(1) A thermoplastic elastomer, which comprises a polyether component (A) as a constituting unit, wherein the carbon/oxygen atomic ratio for the polyoxyalkylene group ($—C_nH_{2n}O—$) constituting the above polyether component is in the range from 2.0 to 2.5, the content of the polyether component in the thermoplastic elastomer is in the range from 50 to 95 weight %, and the glass transition temperature of the thermoplastic elastomer is not more than −20° C.

(2) A thermoplastic elastomer as described in (1), wherein the polyether component (A) is bonded with a poly-isocyanate component (C).

(3) A thermoplastic elastomer as described in (1) or (2), wherein the number-average molecular weight of the polyether component (A) is in the range from 500 to 5,000.

(4) A thermoplastic elastomer as described in any one of (1) to (3), wherein the polyether component (A) comprises a polyethylene glycol component.

(5) A thermoplastic elastomer as described in any one of (1) to (4), wherein a polyester component (B) is contained as a constituting unit and the number-average molecular weight of said polyester component is in the range from 500 to 10,000.

(6) A thermoplastic elastomer as described in any one of (1) to (5), wherein a polyester component (B) is contained as a constituting unit, and said polyester component (B) comprises 50 to 100 weight % of a short-chain polyester component represented by the following general formula (1) and 50 to 0 weight % of a long-chain polyester component represented by the following general formula (2).

$$—CO—R_1—CO—O—R_2—O— \quad (1)$$

(wherein $R_1$ denotes (i) a divalent aromatic hydrocarbon group of 6 to 12 carbons and/or (ii) a divalent alkylene group of 2 to 10 carbons or a divalent cycloaliphatic hydrocarbon of 6 to 12 carbons. $R_2$ denotes an alkylene group of 2 to 8 carbons and/or a divalent cycloaliphatic radical of 6 to 12 carbons).

$$—CO—R_3—CO—O—R_4— \quad (2)$$

(wherein $R_3$ denotes (i) a divalent aromatic hydrocarbon group of 6 to 12 carbons and/or (ii) a divalent alkylene group of 2 to 10 carbons, or a divalent cycloaliphatic hydrocarbon group of 6 to 12 carbons. $R_4$ comprises a repeating unit of —$R_5$—O—, and $R_5$ is an alkylene group of 2 to 8 carbons).

(7) A thermoplastic elastomer as described in any one of (5) or (6), wherein the polyester component (B) comprises a dicarboxylic acid component of which the molar ratio of the aromatic dicarboxylic acid group to the aliphatic dicarboxylic acid group is in the range from 100:0 to 40:60.

(8) A thermoplastic elastomer as described in any one of (5) to (7), wherein the polyester component (B) comprises a diol component of which the molar ratio of the linear aliphatic diol group to the cycloaliphatic diol group is in the range from 100:0 to 40:60.

(9) A thermoplastic elastomer as described in any one of (5) to (8), wherein the polyester component (B) comprises polybutylene terephthalate in 40 to 90 weight %.

(10) A thermoplastic elastomer as described in any one of (2) to (9), wherein the poly-isocyanate component (C) comprises (i) an aliphatic poly-isocyanate component, (ii) a cycloaliphatic poly-isocyanate component, or (iii) a poly-isocyanate component in which the isocyanate group is not directly bonded to the aromatic ring.

(11) A thermoplastic elastomer as described in any one of (2) to (10), wherein the poly-isocyanate component (C) comprises a diisocyanate component represented by the following general formula (3).

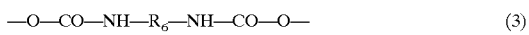

$$—O—CO—NH—R_6—NH—CO—O— \quad (3)$$

(wherein $R_6$ denotes an alkylene group of 2 to 15 carbons, a divalent cycloaliphatic hydrocarbon group, a phenylene group, a methylene group, or a composite radical of alkylene group and phenylene group).

(12) A thermoplastic elastomer containing a polyether component (A) as a constituting unit, which is characterized by that
1) the water absorption ratio of the thermoplastic elastomer is in the range from 50 to 200 weight %,
2) the storge modulus of elasticity of the thermoplastic elastomer at 40° C. is in the range from $1 \times 10^6$ Pa to $25 \times 10^6$ Pa, and
3) the glass transition temperature of the thermoplastic elastomer is not more than −20° C.

(13) A thermoplastic elastomer as described in 12, wherein the thermoplastic elastomer comprising a polyether component (A) as a constituting unit is the thermoplastic elastomer defined in any one of (1) to (11).

(14) A production method of thermoplastic elastomer as described in any one of (2) to (13), which comprises the first process of producing a prepolymer by reacting a polyether compound (a) with a poly-isocyanate compound (c), and the second process of reacting the prepolymer with a polyester compound (b).

(15) A fiber comprising a thermoplastic elastomer as described in any one of the (1) to (13).

(16) A fabric comprising a fiber as described in (15).

(17) An elastomer film or sheet comprising a thermoplastic elastomer as described in any one of (1) to (13).

(18) An elastomer film or sheet produced by a method comprising the first process of manufacturing a prepolymer by reacting a polyether compound (a) and a poly-isocyanate compound (c) and the second process of reacting the prepolymer with a polyester compound (b) and molding continuously the reaction product or the second step.

(19) A moisture permeable waterproofing fabric, which is produced by laminating a fabric on at least one side of an elastomer film or sheet as described in (17) or (18).

(20) A fabric, wherein at least one side of the fabric is coated with a composition containing the thermoplastic elastomer as described in any one of (1) to (13).

(21) A moisture permeable waterproofing fabric as described in (19) or (20), wherein said fabric comprises an elastomer fiber.

(22) An elastomer film, sheet, or a moisture permeable waterproofing fabric as described in any one of (17) to (21), wherein the moisture permeability of the elastomer film, sheet or said moisture permeable waterproofing fabric is not less than 2,000 g/m²(24 hr).

(23) Fabrics, tents, or shoes comprising a moisture permeable waterproofing fabric as described in any one of (20) to (22).

(24) A molded product for medical use obtained by molding the thermoplastic elastomer as described in any one of (1) to (11).

The thermoplastic elastomer according to the present invention contains a polyether component (A) as a constituting unit. The carbon/oxygen atomic ratio for the polyoxyalkylene chain (—$C_nH_{2n}O$—) that constitutes the polyether component (A) is preferably in the range from 2.0 to 2.5. When the carbon/oxygen atomic ratio is larger than 2.5, the affinity with the obtained elastomer and water is decreased, and the moisture permeability or the moisture absorption is diminished. At the same time, the ratio is larger than 2.5, the function of steam sterilization for the molded object of said elastomer used for medical use is degraded.

Concerning the polyether component (A), polyethylene glycol having said carbon/oxygen atomic ratio of 2.0 is preferred. It may be a mixture of polyether having said ratio of not less than 3.0 and polyethylene glycol, in which the total carbon/oxygen atomic ratio can be adjusted to be not more than 2.5.

With regard to the polyether component having said carbon/oxygen atomic ratio of not less than 3.0, there can be mentioned, for example, polypropylene glycol (poly-1,3-propylene glycol or poly-1,2-propylene glycol, for example), poly-tetramethylene glycol, poly-hexamethylene glycol, poly-(ethylene glycol-tetramethylene glycol) copolymer, poly-(ethylene glycol-propylene glycol) copolymer, and others.

The number-average molecular weight for the polyether component (A) is preferably in the range from 500 to 5,000, more preferably in the range from 500 to 3,000. With the number-average molecular weight less than 500, the flexibility of the obtained elastomer may be decreased, occasionally accompanied by diminished moisture permeability or moisture releasing property. On the other hand, with the number-average molecular weight exceeding 5,000, the compatibility with the other components such as the polyester component (B) is decreased, which induces smaller polymerization degree of the obtained elastomer, and occasionally results in the insufficient mechanical strength of the product. The number-average molecular weight is more preferably in the range from 1,000 to 2,000.

Note that the number-average molecular weight of the polyether component (A) corresponds to the average molecular weight of the following polyether (a).

The content of polyether component (A) in the thermoplastic elastomer according to the present invention is usually from 40 to 95 weight %, preferably from 50 to 95 weight %. When the content of polyether component (A) is below 50 weight %, the storage modulus of elasticity is elevated (the elasticity is decreased) together with the lowered molecular mobility, moisture permeability or moisture releasing property. On the other hand, when the polyether component (A) is more than 95 weight % on the other hand, the product does not exhibit enough mechanical strength. The content of the polyether component (A) is preferably from 55 to 90 weight %, more preferably from 60 to 90 weight %.

The glass transition temperature of the thermoplastic elastomer according to the present invention is usually not more than −20° C. When the glass transition temperature is higher than −20° C., the elastomer does not exhibit sufficient rubber elasticity at low temperatures. In addition, molecular mobility is lowered, leading to the deteriorated moisture permeability or moisture releasing property. The glass transition temperature is preferably not more than −30° C.

The glass transition temperature of the present invention is defined as the temperature at which the maximum tangent loss (tanδ) obtained by viscoelasticity measurement on the micro Brownian motion of the molecules of the thermoplastic elastomer appears. This glass transition temperature can be measured by a viscoelasticity spectrometer (for example, RSA-II of Rheometric Scientific Ltd.)

The thermoplastic elastomer according to the present invention preferably contains a polyester component (B) as a constituting unit. Preferably the polyester component comprises 50 to 100 weight % of a short-chain polyester component represented by the following general formula (1) and 50 to 0 weight % of a long-chain polyester component represented by the general formula (2). With the short-chain component less than 50 weight %, the melting point of the polyester component (B) is lowered, occasionally giving a bad influence on the mechanical strength of the obtained elastomer at high temperatures.

  (1)

(wherein $R_1$ denotes (i) a divalent aromatic hydrocarbon group of 6 to 12 carbons and/or (ii) a divalent alkylene or cycloaliphatic hydrocarbon group of 2 to 10 carbons, and $R_2$ denotes an alkylene group of 2 to 8 carbons and/or a divalent cycloaliphatic hydrocarbon group of 6 to 12 carbons.)

  (2)

(wherein $R_3$ denotes (i) a divalent aromatic hydrocarbon group of 6 to 12 carbons and/or (ii) a divalent alkylene or cycloaliphatic hydrocarbon group of 2 to 10 carbons, and $R_4$ is constituted from a repeating unit of —$R_5$—O—, wherein $R_5$ denotes an alkylene group of 2 to 8 carbons.)

The above short-chain polyester component may be obtained by reacting an aromatic dicarboxylic acid or its ester and/or an aliphatic dicarboxylic acid or its ester with a low molecular diol. The long-chain polyester component may be obtained by reacting an aromatic dicarboxylic acid or its ester and/or an aliphatic dicarboxylic acid or its ester with a high molecular diol.

Examples of the aromatic dicarboxylic acid and its ester include, for example, terephthalic acid, iso-phthalic acid, ortho-phthalic acid, naphthalene-dicarboxylic acid, para-phenylene dicarboxylic acid, dimethyl terephthalate, dimethyl iso-phthalate, dimethyl orthophthalate, dimethyl naphthalene-dicarboxylate, and dimethyl para-phenylene dicarboxylate, and so on. They may be employed singly or in a mixed form of more than two kinds.

Examples of aliphatic dicarboxylic acid or its ester include, for example, succinic acid, adipic acid, suberic acid, sebacic acid, 1,2-cyclohexane dicarboxylic acid, 1,4-cyclohexane dicarboxylic acid, dimethyl succinate, dimethyl adipate, dimethyl suberate, dimethyl sebacate, dimethyl 1,2-cyclohexane dicarboxylate, dimethyl 1,4-cyclohexane dicarboxylate, and so on. They may be employed singly or in a mixed form of more than two kinds.

The mole ratio of aromatic dicarboxylic acid to aliphatic dicarboxylic acid, two of which constitute the polyester component (B), is preferably from 100:0 to 40:60. When the mole ratio of aliphatic dicarboxylic acid is not less than 60, the melting point of the produced polyester component (B) is lowered, frequently giving a bad influence on the mechanical strength of the obtained elastomer at high temperatures.

Concerning the low molecular diol, there are linear aliphatic diol and cycloaliphatic diol, etc. Examples of linear aliphatic diol include, for example, ethylene glycol, 1,2-propane diol, 1,3-propane diol, 1,3-butane diol, 1,4-butane diol, neopentyl glycol, 1,5-pentane diol, 1,6-hexane diol, diethylene glycol, triethylene glycol, and so on. They may be employed singly or in a mixed form of more than two kinds. Examples of cycloaliphatic diol include, for example, 1,4-cyclohexane dimethanol 1,2-cyclohexane diol, 1,4-cyclohexane diol and so on. They may be employed singly or in a mixed form of more than two kinds.

In the above general formula (2), $R_5$ denotes, for example, an alkylene group of 2 to 8 carbons. The component consisted of the repeating unit represented by —$R_5$—O— includes the same diols containing the above alkylene group ($R_2$). Examples of $R_4$ include, for example, polyethylene glycol, poly-(1,3-propylene glycol), poly-(1,2-propylene glycol), poly-tetramethylene glycol, poly-hexamethylene glycol, poly-(ethylene glycol-tetramethylene glycol) copolymer, poly-(ethylene glycol-propylene glycol) copolymer. They may be employed singly or in a mixed form of more than two kinds.

In the above general formula (2), $R_4$ denotes a component constituted from a repeating unit represented by —$R_5$—O—. Its number-average molecular weight is preferably from 500 to 5,000. When the number-average molecular weight is less than 500, the block property of the polyester component (B) is diminished, leading to the lowered melting point of the obtained elastomer, thus resulting in inferior mechanical strength of the elastomer at high temperatures. When the number-average molecular weight is larger than 5,000, the compatibility with the polyether component is diminished, leading to smaller polymerization degree of the obtained elastomer, and resulting in the insufficient mechanical strength of the production of fibers. The number-average molecular weight is more preferably in the range from 500 to 2,000.

The mole ratio of linear aliphatic diol to cycloaliphatic diol, both of which constitute the polyester component (B), is preferably in the range from 100:0 to 40:60. With the ratio of the aliphatic diol larger than 60, the melting point of the produced polyester component (B) is elevated, occasionally giving a bad influence on the solubility of the obtained elastomer into solvents. The mole ratio is more preferably in the range from 90:10 to 40:60.

The polyester component (B) preferably contains 40 to 90 weight % of polybutylene terephthalate. When the amount of polybutylene terephthalate is less than 40 weight %, the melting point of the polyester component (B) is lowered, occasionally giving influence on the mechanical strength of the obtained elastomer at high temperatures. On the other hand, when the polybutylene terephthalate is more than 90 weight %, the crystallinity of the elastomer is enhanced, thus occasionally giving a bad influence on the solubility of the obtained elastomer into solvents. The content of polybutylene terephthalate in the polyester component (B) is more preferably from 40 to 80 weight %, and more preferably from 50 to 75 weight %.

There are no limitations about the solvent for dissolving the elastomer. Preferred examples include, for example, polar solvents such as N,N-dimethyl formamide (DMF), N-methyl pyrrolidone (NMP), N,N-dimethyl acetoamide, methylethyl ketone (MEK), dioxane, toluene, and so on.

Examples of the high molecular diol include polyethylene glycol, polypropylene glycol, polytetramethylene glycol, poly-hexamethylene glycol, poly(ethylene glycol-tetramethylene glycol) copolymer, ethylene oxide-tetrahydrofuran copolymer, poly (ethylene glycol-propylene glycol) copolymer, and so on.

The number-average molecular weight of above-mentioned polyester component is preferably in the range from 500 to 10,000, more preferably in the range from 500 to 5,000. When the number-average molecular weight less than 500, the block property of the obtained elastomer is decreased, occasionally leading to the lowered melting point, and resulting in the inferior mechanical strength of the obtained elastomer at high temperatures. When the number-average molecular weight is larger than 10,000, on the other hand, the compatibility with the polyether component (A) is decreased, which induces smaller polymerization degree of the obtained elastomer, occasionally resulting in the insufficient mechanical strength of the product. The number-average molecular weight is most preferably in the range from 500 to 2,000. Note that the number-average molecular weight of the polyester component (B) corresponds to average molecular weight of the ordinary polyester (b).

Number-average molecular weight measurements in the present invention were carried out under the following conditions.
Apparatus: HLC 8020 series produced by TOSOH Co.
Column: Shodex HFIP 806M (in two).
Solvent: hexafluoro-isopropanol
(added of 0.005N sodium trifluoro-acetate).
Standard: Polymethyl methacrylate (for standard)
Temperature: 23° C.

The thermoplastic elastomer according to the present invention containing the polyether component (A) as a constituting unit may be obtained by the known methods. For example, the above aromatic dicarboxylic acid or its ester and/or aliphatic dicarboxylic acid or its ester is treated for the ester-interchange reaction with an excess amount of the above low-molecular diol and, if necessary, above high-molecular diol under the presence of catalysts such as tetrabutyl titanate with heating at 160 to 200° C. This is followed by, for example, the condensation reaction under reduced pressure at 240 to 250° C. to yield the thermoplastic elastomer.

The thermoplastic elastomer according to the present invention is preferably contains the thermoplastic elastomer wherein the above polyether component (A) is bonded with the poly-isocyanate component (C), or the thermoplastic elastomer wherein the polyether component (A) and the polyester component (B) are connected via the polyisocyanate component (C).

The thermoplastic elastomer according to the present invention preferably contains a urethane-bonding component represented by the general formula (3) as the polyisocyanate component (C).

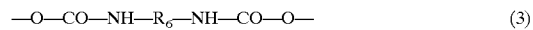

—O—CO—NH—R$_6$—NH—CO—O—  (3)

(wherein R$_6$ denotes an alkylene group, a phenylene group, or a methylene group, or a combined group of alkylene group and phenylene group.)

Preferred for the thermoplastic elastomer containing the urethane-binding component represented by the general formula (3) can be obtained by condensation of isocyanate compounds with compounds containing hydroxyl group at the molecular terminal. Examples include thermoplastic polyurethane elastomer, polyether-ester elastomer elongated of its chain length with isocyanates, polyether-amide elastomer elongated of its chain length with isocyanates, or ester elastomer made by the reaction of a polyester compound (b) and a polyether compound (a) connected via a polyisocyanate compound (c).

To sum up, the preferred examples for the thermoplastic elastomer constituting the present invention include a block copolymer of the polyether component (A) and the polyester component (B) in repeated form. The polyester component (B) comprises 50 to 100 weight % of the short-chain polyester component represented by the general formula (1), and 50 to 0 weight % of the long-chain polyester component represented by the general formula (2). Here the polyether component (A) and the polyester component (B) are connected via the poly-isocyanate component (C) represented by the general formula (3) yielding the thermoplastic elastomer compositions.

In order to obtain such thermoplastic elastomer connected via the poly-isocyanate component (c), the polyether compound (a) and the polyester compound (b) may be reacted with the poly-isocyanate compound (c).

The molecular structure of poly-isocyanate compound (c) is not limited specifically, but it has more than two isocyanate groups within a single molecule. When the isocyanate has an isocyanate group directly bonded to an aromatic ring, the product is yellowed under radiation of light, and it will be difficult to use it for the field needing for light resistance. Thus aliphatic isocyanates, cycloaliphatic isocyanate, or orisocyanates, in which an aromatic ring is not directly connected with the isocyanate group, are more preferable.

The average content of the isocyanate group per one molecule of the poly-isocyanate compound (c) is preferably in the range from 2.0 to 2.2. Examples of isocyanate compounds containing two isocyanate groups in average include, for example, aromatic diisocyantes such as 4,4'-diphenylmethane diisocyanate, tolylene diisocyanate, phenylene diisocyanate, naphthalene diisocyanate, and the like; aliphatic diisocyanates such as methylene diisocyanate, 1,2- ethylene diisocyanate, 1,3-propylene diisocyanate, 1,4-buthane diisocyanate, 1,5-pentamethylene diisocyanate, 1,6-hexamethylene diisocyanate, octamethylene diisocyanate, lysine diisocyanate, and so on; cycloaliphatic diisocyanate such as 1,4-cyclohexane diisocyanate, 1,3-cyclohexane diisocyanate, isophorone diisocyanate, trimethyl-hexamethylene diisocyanate, hydrogenated 4,4'-phenyl-methane diisocyanate, hydrogenated xylene diisocyanate, and the like; and diisocyanate compounds in which the isocyanate group is not directly bonded to an aromatic ring such as xylene diisocyanate and tetramethyl-xylene diisocyanate, and so on. The isocyanate wherein the average isocyanate group in one molecule is in the range from 2.0 to 2.2 can be used by mixting isocyanate compounds that contain average isocyanate groups of more than 2.2 and another compounds that contain average isocyanate groups of 2.0 may be allowed.

A typical example of isocyanate compounds that contain average isocyanate groups of more than 2.2 in one molecule is polymeric MDI. Its commercial products include 'Millionate MR200' (produced by Nippon Polyurethane Co.) which contains average isocyanates of 2.8. Other examples are triphenyl-methane triisocyanate (average isocyanate of 3.0), tris-(isocyanate-phenyl) thiophosphate (average isocyanate of 3.0), hexamethylene triisocyanate (average isocyanate of 3.0), lysine ester triisocyanate (average isocyanate of 3.0), 1,8-diisocyanate-4-isocyanate methyl-octane (average isocyanate of 3.0), and 1,6,11-undecane triisocyanate (average isocyanate of 3.0).

In the present invention, the mole ratio of the isocyanate group contained in the poly-isocyanate compound (c) is preferably in the range from 0.60 to 1.05 times to the mole of active hydrogen-containing group (which can react with the above-mentioned isocyanate group) contained in the polyether compound (a) and the polyester compound (b).

When the mole ratio is smaller than 0.60, the molecular weight of the obtained elastomer is lowered, leading to the insufficient mechanical strength. When the mole ratio is larger than 1.05, on the other hand, the obtained elastomer may yield side reaction products such as unstable allophanate group or buret group, which may cause considerable deterioration in the molding function or the physical properties of the obtained elastomer with a lase of time. The mole ratio is more preferably in the range from 0.80 to 1.01. Within the ratio, the allophanate group or the buret group hardly generates, and the molecular weight of the obtained elastomer becomes high, leading to its excellent physical properties.

The thermoplastic elastomer according to the present invention comprising the polyether component (A) and the polyester component (B) connected via the polyisocyanate component (C) is preferably produced through the first process of manufacturing a prepolymer isocyanated at its both molecular terminals, which is made by reacting the above polyether compound (a) and the polyisocyanate compound (c), and the second process of reacting the prepolymer with the polyester compound (b) having two hydroxyl groups at its both molecular terminals.

The above polyester compound (b) and the polyether compound (a) have usually two hydroxyl groups at their molecular terminals, but may also contain the carboxyl group within 5 equivalent percent. The prepolymer is polymerized using the connecting component containing the urethane-bonding represented by the general formula (3) when the two terminal functional groups, which react with the above isocyanate compound, are both the hydroxyl group. When one molecular terminal of the polyester compound (b) or the polyether compound (a) is hydroxyl group and the other molecular terminal is carboxyl group, the prepolymer is polymerized using the connecting component containing the urethane bonding represented by the general formula (4). When the two molecular terminal functional groups of polyester copolymer are both carboxyl groups, the urethane-bonding can include the parts which can be connected with the diisocyanate compound represented by the general formula (5).

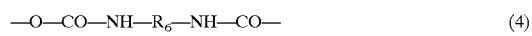

(wherein $R_6$ has the same meaning defined above)

(wherein $R_6$ has the same meaning defined above) ($R_6$ is similar to the note for equation (3).)

The above polyester compound (b) preferably contains hydroxyl group at the molecular terminals in more than 95 equivalent percent. Hydroxyl group and carboxyl group are the possible terminal functional group for the polyester compound (b). When the hydroxyl group is less than 95 equivalent percent, the reactivity with the poly-isocyanate compound (c) is diminished, and the polymerization degree of the obtained elastomer is lowered, frequently leading to the insufficient mechanical strength of the elastomer.

The terminal functional group of the polyester compound (b) can be quantitatively evaluated by using the acid value and the hydroxyl value. The acid value and the hydroxyl value can also be measured by following methods, but it is also possible to employ the certified value of the manufacturer.

Acid value: A sample is dissolved into a mixed solvent of benzylalcohol/chloroform followed by the neutralization titration using phenol red as the indicator to obtain the acid value.

Hydroxyl value: A sample is dissolved in a mixed solvent of nitrobenzene/pyridine with succinic anhydride for reaction for 10 hours, and the reaction solution is mixed with methanol for precipitation. The obtained reaction product is treated to above-mentioned acid value measurement, and the result is specified as the hydroxyl value.

In the first process described above, the mole ratio of the isocyanate group contained in the poly-isocyanate compound (c) is preferably in the range from 1.1 to 2.2 times, more preferably in the range from 1.2 to 2.0 times to the active hydrogen-containing group, which can be reacted with the isocyanate group, contained in the polyether compound (a). When the mole ratio is less than 1.1 times, the both molecular terminals of the yielding prepolymer can not be converted fully into the isocyanate group, frequently hindering the reaction in the second process. When the ratio is larger than 2.2, on the other hand, the unreacted isocyanate compound (c) remains in the reaction mixture, which occurs side reactions yielding sideproducts such as allophanate group or buret group. As a result, the molding ability or the physical properties of the obtained elastomer are occasionally degraded.

In the above first process, the reaction temperature is preferably in the range from 100 to 240° C. When the reaction temperature is below 100° C., the reaction does not proceed sufficiently. On the other hand, when the temperature is above 240° C., the polyether compound may frequently decompose. The reaction temperature is more preferably in the range from 160 to 220° C.

In the second process, the prepolymer formed in the first process is reacted with the above polyester compound (b). The mole ratio of the isocyanate group contained in the above poly-isocyanate compound (c) is preferably in the range from 0.60 to 1.05 times, more preferably in the range from 0.80 to 1.01 times to the sum of the active hydrogen-containing group contained in the above polyether compound (a) and the active hydrogen-containing group contained in the polyester polymer (b). With this limitation, proceeding of side reactions may be prevented, and the molecular weight of the obtained elastomer is large enough to give excellent physical characters.

In the second process the reaction temperature is preferably in the range from 100 to 240° C. With the reaction temperature below 100° C., the reaction may not proceed sufficiently. With the reaction temperature above 240° C., on the other hand, the prepolymer may frequently decompose, thus elastomer with sufficient mechanical strength may not be obtained. The reaction temperature is more preferably in the range from 160 to 220° C. In this process, the polyester compound (b) may be melted down by heating in a different vessel and added to the prepolymer using a pump, or the polyester compound (b) may be heated with an extruder for meltdown and then added to the prepolymer.

The above reaction is preferably carried out in the bulk state. With this reaction method, the reactivity of the second process is improved significantly. With regard to the reaction apparatus, mono-axial or bi-axial extruder can be usually employed, but it is not limited specifically. A bi-axial extruder wherein two axes rotate in the same direction and a bi-axial extruder wherein two axes ratate individually in different direction is preferably used due to the excellent efficiency in the stirring and mixing. A bi-axial extruder wherein two axes rotate in the same direction is more preferably employed. With this apparatus, the reactivity of the second process is improved significantly. A tandem extruder is preferably employed for carrying out the first process and the second process continuously.

It may be possible to use catalysts in the above process of stirring and mixing. Examples of such catalysts include diacyl tin (I), tetraacyl tin (II), dibutyl tin oxide, dibutyl tin laurate, dimethyl tin malate, tin dioctanoate, tin tetraacetate, triethylene amine, diethylene amine, triethyl amine, metal salts of naphthenic acid, metal salts of octanoic acid, tri-isobutyl aluminum, tetrabutyl titanate, calcium acetate, germanium dioxide, and antimony trioxide. They may be used in combination of more than two kinds.

When the prepolymer, wherein two molecular terminals are converted into isocyanate group which is obtained by reacting the polyether compound (a) with the poly-isocyanate compound (c), is reacted with the polyester compound (b) containing hydroxyl group at its both molecular terminals, a thermoplastic elastomer comprising block copolymer is obtained stably, in which the polyether component (A) and the polyester component (B) are connected via the poly-isocyanate component (C). In this case, the chain of polyether compound (a) and the polyester compound (b) may not be prolonged with the poly-isocyanate compound (c) individually. When the prepolymer reacts with the polyester compound (b) partly, the product can work as a compatibility agent for the polyether compound (a) and the polyester compound (b). In this case the elastomer production may become possible even when the compatibility of the polyether compound (a) and the polyester compound (b) is insufficient.

It is also possible to convert the molecular terminals of the obtained thermoplastic elastomer into polyester group by controlling the equivalence for the polyether compound (a), the polyester compound (b), and the isocyanate compound (c), for example, reacting the prepolymer with an excess amount of the polyester compound (b) in the second process. With this conversion, higher melting points of the thermoplastic elastomer can be accomplished, and the molding property is improved as well as the physical properties at high temperatures.

It is possible to add stabilizers to the thermoplastic elastomer according to the present invention at or after the time of production. Examples of stabilizers are, for example, hindered phenol antioxidants such as 1,3,5-trimethyl-2,4,6-tris(3,5,-di-t-butyl-4-hydroxybenzyl) benzene, and 3,9-bis{2-[3-(3-t-butyl-4-hydroxy-5-methylphenyl)-propionyl oxy]-1,1-dimethylethyl}-2,4,8,10-tetraoxaspiro[5,5] undecane; thermal stabilizers such as tris(2,4-di-t-butylphenyl) phosphite, trilauryl phosphite, 2-t-butyl-alpha-(3-t-butyl-4-hydroxyphenyl)-p-cumenyl-bis(p-nonylphenyl) phosphite, dimiristyl-3,3'-thiodipropionate, distearyl-3,3'-thiodipropionate, pentaerythrityl tetraxis(3-lauryl-thiopropionate), and ditrodecyl-3,3'-thiodipropionate.

It is also possible to add additives including bubble core forming agents, fibers, inorganic fillers, flame retardants, ultraviolets absorbers, anti-static agents, inorganic substances, and salts of higher fatty acids to the thermoplastic elastomer according to the present invention as long as the practical quality of the elastomer is not impaired.

Examples of the above bubble core forming agents are calcium carbonate, talc, clay, magnesium oxide, zinc oxide, carbon black, silicon dioxide, titanium oxide, sodium hydrogencarbonate, citric acid, ortho-boric acid, and alkaline earth metal salts of fatty acids, of which particle size is preferably not more than 500 micrometers.

Examples of the above fibers include, for example, glass fibers, carbon fibers, boron fibers, silicon carbonized fibers, alumina fibers, amorphous fibers, inorganic fibers such as silicon fibers/titanium fibers/ or carbon fibers, and organic fibers such as aramid fibers.

Examples of the above inorganic fillers are, for example, calcium carbonate, titanium oxide, mica, talc, and so on. Examples of the above flame retardants are hexabromocyclododecane, tris(2,3-dichloropropyl) phosphate, pentabromo-phenyl-allyl ether, and so on.

Examples of the above ultraviolet absorbers include, for example, p-t-butylphenyl salicylate, 2-hydroxy-4-methoxy-benzophenone, 2-hydroxy-4-methoxy-2'-carboxybenzophenone, 2,4,5-trihydroxy-butylophenone, and so on.

Examples of the above anti-static agents are, for example, N,N-bis(hydroxyethyl)-alkyl amine, alkylaryl sulfonates, alkyl sulfonates, and so on.

Examples of the above inorganic substances include barium sulfate, alumina, and silica. Examples of the above salts of higher fatty acids are sodium stearate, barium stearate, and sodium palmitate, and so on.

The thermoplastic elastomer according to the present invention may be modified of its properties by blending other thermoplastic resins, or rubber components. Examples of such thermoplastic resins are polyolefin, modified polyolefin, polystyrene, polyvinyl chloride, polyamides, polycarbonates, polysulfones, polyesters, and so on.

Examples of such rubber components include, for example, natural rubber, styrene-butadiene copolymers, polybutadiene, polyisoprene, acrylonitrile-butadiene copolymers, ethylene-propylene copolymers (EPM, EPDM), polychroloprene, butyl rubber, acryl rubber, silicon rubber, urethane rubber, olefin thermoplastic elastomers, styrene thermoplastic elastomers, PVC thermoplastic elastomers, ester thermoplastic elastomers, amide thermoplastic elastomers, and so on.

The thermoplastic elastomer according to the present invention may be molded into molded products using methods such as press molding, extrusion molding, injection molding, or blow molding. The molding temperature varies depending on the melting point of the employed elastomer and the molding method, but is preferably in the range from 160 to 250° C. When the molding temperature is lower than 160° C., the flowability of the ester elastomers becomes low, leading to the non-homogeneous molded products. When the molding temperature is higher than 250° C., on the other hand, the obtained elastomer decomposes frequently, yielding products with insufficient mechanical strength.

The thermoplastic elastomer according to the present invention may be preferably employed for molded parts such as automobile, electric and electronic parts, industrial parts, sport goods, medical goods, sanitary goods, and the like.

Examples of the above automobile parts include boots such as equal-speed joint boots, rack and pinion boots; ball joint seals; safety belt parts; bumper facias; emblems; and molls. Examples of the above electric and electronic parts are, for example, cable covering materials, gears, rubber switches, membrane switches, tact switches, and O-rings. Examples of the above industrial parts include, for example, oil pressure hoses, coil tubes, sealing agents, packings, V-belts, rolls, anti-vibration materials, shock absorbers, couplings, and diaphragms.

Examples of the above sport goods are sole of a shoe, balls for ball games, moisture permeable waterproofing clothes, and so on.

Examples of the above medical goods are containers such as infusion bags and blood transfusion bags; tubes including infusion set tubes, blood transfusion system tubes, and catheters; or the stoppers thereof.

Examples of the above sanitary goods are dehumidication agents, aromatic agents, diapers, menstrual goods, and soon. In addition, the thermoplastic elastomer can be favorably employed for the raw material of elastomer fibers, elastomer sheets, composite sheets, hot-melt adhesives, and polymer-alloys with other plastic resins.

The fiber according to the present invention is one made from the above thermoplastic elastomer. The fiber according to the present invention may be a composite fiber of the above thermoplastic elastomer and other fibers, but preferably contains the thermoplastic elastomer in not less than 10 weight %. When the content is less than 10 weight %, the product may not fully exhibit the moisture absorption and moisture-releasing property deriving from the thermoplastic elastomer.

The fiber according to the present invention may be produced by spinning the above thermoplastic elastomer according to the ordinary method. In more detail, the thermoplastic elastomer obtained thus above may be processed into fibers depending on the known methods such as dry spinning, wet spinning, or melt spinning. The processed form may be either a staple or a filament.

In order to produce products with thin denier, the melt spinning method is preferred. To be precise, such thin fibers may be produced either by the melt spinning of the thermoplastic elastomer after it is once pelletized, or by spinning the thermoplastic elastomer obtained by the meltdown polymerization, which is directly conveyed to the spinnerest. Taking the spinning stability into account, the method of spinning right after polymerization is preferred. The non-drawn fibers obtained by the meltdown and spinning may be heat-treated or drawn in heating.

The fabric according to the present invention is one made from fibers of the above thermoplastic elastomer. The fabric according to the present invention may be a composite of the fiber of the above thermoplastic elastomer and the fiber of other plastic resins. In the case where a fabric is not containing fibers of the thermoplastic elastomer, it will exhibit low absorption s for moisture and sweat. When such fabric is employed for clothes, it will give the user a sticky feeling due to sweat.

Concerning the molding method of film or sheet, there are various known methods including T-die method, inflation method, solution casting method (dry coagulation method), or wet coagulation method. The produced film or sheet may be drawn or may not be drawn.

The non-drawn film or sheet may be produced, for example, by the melt extrusion on a casting drum.

The mono-axial drawn film or sheet may be produced by interposing a non-drawn elastomer sheet, between two pinch rolls of different rotation rates, drawing said sheet along the lengthwise in heating. In this case, the ratio of rotation rates of the two rolls (the rolling-up roll and the sending-out roll) corresponds to the elongation percentage.

The bi-axial drawn film or sheet may be obtained by stretching a non-drawn sheet to bi-axial direction simultaneously or consecutively. In the case of consecutive drawing, the order of stretching may be the first lengthwise drawing and then widthwise, or vice verse. It is also possible to repeat lengthwise and widthwise drawing in more than two times for both the simultaneous bi-axial drawing or the consecutive bi-axial drawing.

The elongation percentage of the film or the sheet to the lengthwise or the widthwise direction may be freely determined depending on the targeted drawing degree, strength, or the modulus of elasticity of the desired film or sheet, but it is preferably in the range from 2.5 to 5.0. The elongation percentage, it can be set to be the same values or different values for the lengthwise direction and the widthwise direction respectively. It is also possible to carry out a heating process for the film or sheet after the bi-axial drawing. It may be carried out in any of the known methods such as in an oven or on a heated roll.

It may be carried out loosening the film or sheet to the lengthwise or the widthwise direction.

The elastomer film or sheet according to the present invention may be produced by molding pellets of the above thermoplastic elastomer using known methods. But it is preferable to mold the molten thermoplastic elastomer continuously through dice directly after the above two-stepped manufacture of the thermoplastic elastomer due to the following reasons.

One reason is the preparation procedure for the molding becomes very complicated. Since the thermoplastic elastomer consisting elastomer film or sheet according to the present invention readily absorbs moisture, it is quite important to carry out the moisture management of pellet in order to produce molded products of uniform quality, with a method of molding after pelletizing.

The second reason is the coagulation of pellets. When the soft segment of the elastomer is increased for improving the flexibility and moisture permeability of the produced elastomer film or sheet, this phenomenon is apt to arise and degrades the handling property at the molding process.

The layer of the thermoplastic elastomer according to the present invention may be mono-layer or multi-layer.

In the multi-layer, polyamide resins or polyester resins may preferably be used for the lamination.

The laminated film or sheet according to the present invention is produced by laminating at least one fabric on one surface of the above elastomer film or sheet, but the kinds or laminating methods are not limited specifically.

The fabric used in the present invention includes, for example, non-woven fabric, woven or knitted fabric. The above non-woven fabric is not limited to these examples in any manner, for example, non-woven fabric made by dry methods including needle punch method, spun lace method, spun bond method, or melt blow method; non-woven fabric made by wet methods such as paper making method; non-woven fabric by the combination of wet method and dry method; and laminates of these non-woven fabric.

Examples of fibers constituting the above non-woven fabric are, though not limited in any manner, natural fibers such as cotton, hemp, wool, and the like; cellulose regenerated fibers; synthetic fibers on polyamide, polyester, polyolefin, polystyrene, polyacryl, polyvinyl alcohol or the like; and inorganic fibers made of pulp or glass fiber. These fibers may be employed singly or in mixed form. Among them synthetic fibers on polyolefin, polyester, and polyamide are favorably employed due to their durability.

Examples of the above woven or knitted fabric include, though not limited to the examples in any manner, woven fabrics of basic wave such as plain weave, twill weave, or sateen weave; derivative weave; combination weave; and knits of warp knitting, weft knitting, or circular knitting.

Examples of fibers constituting the above woven or knitted fabric are, though not limited to these examples in any manner, synthetic fibers on polyamide, polyester, polyacrylonitrile, or polyvinyl alcohol; semi-synthetic fibers such as triacetate; or mix-spun fibers including nylon-6/cotton or polyethylene terephthalate/cotton.

Preferably these fabrics should have the elasticity, though not limited in any manner. The advantages of the elasticity are, for example, in the case of making clothes, it is superior in fitting sense and easy to move.

The coating method of fabric with the thermoplastic elastomer according to the present invention is not limited in any manner, but the adhesive laminating method, in which the elastomer film or sheet is adhered to a fabric using adhesives, or the heat-melt laminating method utilizing heat may be listed as examples. In particular, preferably employed is the extrusion laminating method, in which the elastomer film or sheet is extrusion-molded in heating, quickly laminated with a fabric while it retains the heat-melt quality, and pressed with a roll for stable adhesion.

The moisture permeable waterproofing fabric according to the present invention may be produced as previously described.

The moisture permeability is determined on the Japanese JIS Z 0208.

The moisture permeability of the moisture permeable waterproofing fabric is not less than 2,000 g/m$^2$(24 hr), preferably not less than 4,000 g/m$^2$(24 hr), more preferably not less than 6,000 g/m$^2$(24 hr).

With the above moisture permeability of less than 2,000 g/m$^2$(24 hr), an adequate air permeability is not obtainable. When such fabric is used for clothes, it readily provokes dew condensation, gives wet or sticky feeling to a wearer, and results in the uncomfortable sense for the wearer.

The thickness of the moisture permeable waterproofing fabric is preferably from 0.05 to 5 mm, more preferably from 0.05 to 3 mm, and more preferably from 0.1 to 2 mm. The thinner fabrics are apt to break, and the thicker fabrics lose their moisture permeability.

The molded product used for medical treatment according to the present invention may be manufactured by known methods such as press molding, extrusion molding (tube molding, inflation molding, T-die molding, etc.), injection molding, blow molding, vacuum molding, compression molding, calendar molding, or solution casting. The preferred molding temperature varies depending on the melting point and the molding method of the thermoplastic elastomer that is used for medical treatment, but preferably is below 250° C. With the molding temperature above 250° C., the thermoplastic elastomer becomes to decompose, yielding elastomer with insufficient mechanical strength. The injection-molded products for medical treatment according to the present invention may take the form of film, sheet, tube, bag, or stoppers thereof.

The present invention provides a thermoplastic elastomer comprising a polyether component (A) as a constituting unit, which is characterized by the following factors:
1) The water absorption ratio of the thermoplastic elastomer is in the range from 50 to 200 weight %,
2) The storage modulus of elasticity of the thermoplastic elastomer at 40° C. ranges from $1\times10^6$ Pa to $25\times10^6$ Pa,
3) The glass transition temperature of the thermoplastic elastomer is less than –20° C.

The water absorption ratio is preferably in the range from 50 to 200 weight %. It is largely affected by the content of the polyether component in the thermoplastic elastomer and by the affinity of the polyether with water. With the water absorption ratio of less than 50 weight %, the obtained affinity of elastomer with water decreases, leading to the inferior moisture permeability. With the water absorption ratio of more than 200 weight %, the elastomer exhibits considerably degraded physical properties when it is absorbing water, which may be unacceptable for the practical use. The water absorption ratio is more preferably in the range from 60 to 150 weight %.

The water absorption ratio of the thermoplastic elastomer may be determined by the following procedure:
(1) A test piece (sheet of 50 mm×50 mm×1 mm) is dried thoroughly in a desiccator containing silica gel, and measured of its weight ($W_0$).
(2) It is impregnated in ion-exchanged water at 23° C. for 24 hours, and measured of its weight ($W_1$).
(3) The water absorption ratio=$(W_1-W_0)\times100/W_0$ (weight %).

It is also preferable that the storage modulus of elasticity of the thermoplastic elastomer at 40° C. is in the range from $1\times10^6$ Pa to $25\times10^6$ Pa. The storage elastic modulus is largely influenced by the content of the polyether component in the thermoplastic elastomer. When the storage elastic modulus is less than $1\times10^6$ Pa, the mechanical strength of the elastomer becomes insufficient. When the storage elastic modulus is larger than $25\times10^6$ Pa, the molecular mobility of the elastomer is suppressed, leading to the degraded moisture permeability. The storage elastic modulus of the thermoplastic elastomer is preferably in the range from $5\times10^6$ Pa to $15\times10^6$ Pa.

The thermoplastic elastomer according to the present invention may be easily manufactured by the above methods or selecting the thermoplastic elastomer satisfying the above condition 1), 2) and 3) from the thermoplastic elastomer produced by the above methods.

The thermoplastic elastomer according to the present invention is improved of its affinity with water by comprising the soft segment made from specific polyether component, which accelerates the absorption of water molecule. Further, the molecular mobility of the elastomer has been activated by employing the specific glass transition point and the specific content of the soft segment, which also accelerate the diffusion of water molecule. With these molecular designs, the elastomer becomes a material having extraordinary high moisture permeability.

It also becomes an elastomer material of excellent light resistance by employing the aliphatic and the cycloaliphatic isocyanate group, or the isocyanate-containing aromatic compound, in which the isocyanate group is not directly bonded to the aromatic ring.

The thermoplastic elastomer according to the present invention exhibits its elastomeric characters due to the formation of cross-linking connections at its crystalline component, which is mainly made from the short-chain polyester component. In more detail, the thermoplastic elastomer comprises a short-chain polyester-rich component having a high block property and a polyether-rich component, and contains a more readily crystallizing short-chain polyester component compared with the existing polyester thermoplastic elastomers with similar elasticity. As a result, stronger cross-linking points are formed, yielding the thermoplastic elastomer materials that possess excellent flexibility and mechanical characters at high temperatures simultaneously.

The water absorption or moisture absorption of the fiber is controlled by the adsorption of water molecules at the surface of the fiber. And the water releasing property is controlled by the diffusion of water molecules within the fiber and evaporation of water molecules from the surface, which has the lower partial pressure of water vapor.

The thermoplastic elastomer according to the present invention exhibits higher affinity with water due to its specific composition of the soft segment, which promotes the absorption of water. The molecular mobility of the elastomer is further promoted by having the specific glass transition temperature and the specific content of the soft segment, which also accelerate the diffusion of water molecules. on these molecular designs, the fibers made from the thermoplastic elastomer according to the present invention and fabric made of these fibers have accomplished the extraordinary high water absorption and moisture release.

The elastomer film or sheet according to the present invention exhibits high affinity with water due to its soft segment comprising a specific polyether component, which promotes the adsorption of water. Furthermore, the molecular mobility of elastomer has been promoted by having the specific glass transition temperature and the specific content of the soft segment, which also accelerate the diffusion of water molecules. on these molecular designs, the elastomer materials according to the present invention are equipped with the extraordinary high water moisture permeability.

The thermoplastic elastomer constituting elastomer film or sheet according to the present invention exhibits its elastomeric characters due to the formation of cross-linking connections at its crystalline segment, which comprises a short-chain polyester component. In more detail, the thermoplastic elastomer comprises a short-chain polyester-rich component having a high block property and a polyether-rich component, and contains a more readily crystallizing short-chain polyester component compared with the existing polyester thermoplastic elastomers with similar elasticity. As a result, stronger cross-linking points are formed, yielding the thermoplastic elastomer materials possessing excellent flexibility and mechanical characters at high temperatures simultaneously.

The thermoplastic elastomer composition according to the present invention used for production of moisture permeable waterproofing fabric exhibits higher polarity of the resin layer, higher affinity with water, and resultantly higher moisture permeability by setting its carbon/oxygen atomic ratio for the polyether component to be 2.0 to 2.5. When the polyether component of the thermoplastic elastomer was set in the range from 50 to 95 weight %, and its glass transition temperature is controlled at less than −20° C., the product exhibits improved diffusion of water vapor in the resin and accordingly higher moisture permeability.

The moisture permeable waterproofing fabric according to the present invention is equipped with high moisture permeability and waterproofing property due to lamination of the above thermoplastic elastomer composition, and is suitable for clothes, tents, or shoes.

The molded product for medical treatment according to the present invention comprises the thermoplastic elastomer possessing the following features, and possesses an extraordinary high steam sterilization propaty. The constituting thermoplastic elastomer exhibits higher affinity with water due to the soft segment comprising a specific polyether component, and accelerates the adsorption of water molecules. Furthermore, the molecular mobility has been promoted with the specific glass transition temperature and the specific content of the soft segment, which also accelerate the diffusion of water molecules. on these molecular designs, the elastomer materials according to the present invention are equipped with the extraordinary high moisture permeability.

The thermoplastic elastomer according to the present invention exhibits its elastomeric characters due to the formation of cross-linking connections at its crystalline segment, which comprises a short-chain polyester component. In more detail, the thermoplastic elastomer comprises a short-chain polyester-rich component having a high block property and a polyether-rich component, and contains a more readily crystallizing short-chain polyester component compared with the existing polyester thermoplastic elastomers with similar elasticity. As a result, stronger cross-linking points are formed, yielding elastomer materials possessing excellent flexibility and mechanical characters at high temperatures simultaneously. Thus, the molded product for medical treatment is superior in elasticity, heat resistance and sterilization resistance.

Thermoplastic elastomer according to the present invention exhibits higher affinity with water due to its specific water absorption ratio, which accelerates the adsorption of water molecules. Furthermore, the molecular mobility has been promoted with the specific glass transition temperature and the specific sotred modulus of elasticity, which also accelerate the diffusion of water molecules. On these molecular designs, the elastomer materials according to the present invention are equipped with the extraordinary high moisture permeability.

The thermoplastic elastomer according to the present invention exhibits its elastomeric characters due to the formation of cross-linking connections at its crystalline segment, which comprises a short-chain polyester component. In more detail, the thermoplastic elastomer comprises a short-chain polyester-rich component having a high block property and a polyether-rich component, and contains a more readily crystallizing short-chain polyester component compared with the existing polyester thermoplastic elastomers with similar elasticity. As a result, stronger cross-linking points are formed, yielding the thermoplastic elastomer materials possessing excellent flexibility and mechanical characters at high temperatures simultaneously.

Among the objects and problems to be solved in the present invention, the provision of elastomer with excellent flexibility, mechanical characteristics at high temperatures, and especially settling resistance at high temperatures, and the provision of the production method thereof are solved by the part I of the present invention mentioned above. The objects and problems may also be solved by the following part II of the present invention.

The detailed description of the preferred embodiments for the part I of the present invention is given in the reference examples 1 to 6, the examples 1 to 31, the comparative examples 1 to 16, and the tables 1 to 7. The detailed description of the preferred embodiments for the part II of the present invention is given in the examples 32 to 35, the comparative examples 21 and 22, and the tables 11 and 12.

In the present patent specification, therefore, the following section down to the preferred embodiments of the present invention belongs to the part II of the present invention.

In view of the above description, the part II according to the present invention relates to an ester elastomer that has a high block property for the hard segment components and soft segment components, has compatibility of elasticity and mechanical strength at high temperatures, especially settling resistance at high temperatures, a production method thereof, an amide elastomer, and a production method thereof. And it also provides a production method of amide-elastomer and amide-elastomer.

The problems and the objects for the part II of the present invention may be solved by the following means.

(1) A production method of ester elastomer wherein a polyester component (S) and a polymeric component (T) possessing hydroxyl group at the two molecular terminals are combined via an isocyanate component (U) to form an ester block copolymer, in which the isocyanate component is expressed by the general formula (51), $$—O—CO—NH—R^{1\prime}—NH—CO—O— \quad (51)$$

(wherein $R^{1\prime}$ denotes an alkylene group of 2 to 15 carbons, $—C_6H_4—$ (phenylene group), $—C_6H_4—CH_2—$, or $—C_6H_4—CH_2—C_6H_4—$) or by the general formula (52), $$—O—CO—NH—R^{2\prime}—NH—CO— \quad (52)$$

(wherein $R^{2\prime}$ denotes an alkylene group of 2 to 15 carbons, $—C_6H_4—$ (phenylene group), $—C_6H_4—CH_2—$, or $—C_6H_4—CH_2—C_6H_4—$); the polyester component (S) comprises a repeating unit expressed by the general formula (53), $$—CO—R^{3\prime}—CO—O—R^{4\prime}—O— \quad (53)$$

(wherein $R^{3\prime}$ denotes a divalent aromatic hydrocarbon group of 6 to 12 carbons, and $R^{4\prime}$ denotes an alkylene group of 2 to 8 carbons); the polymeric component (T) possessing hydroxyl group at the two molecular terminals has the glass transition temperature of not more than 20° C. and the number-average molecular weight of in the range from 500 to 5,000; the ester elastomer comprises 50 to 2,000 parts by weight of the polymeric component (T) with hydroxyl group at the two molecular terminals and 10 to 100 parts by weight of the isocyanate component (U) relative to 100 parts by weight of the polyester component (S), and the production method of the ester elastomer comprises the following two processes; i) production of prepolymer by reacting the polymeric component (T) possessing hydroxyl group at the two molecular terminals with the diisocyanate compound (U') and ii) reaction of the above prepolymer with the polyester component (S).

(2) A production method of ester elastomer according to the above (1), wherein the polymeric component (T) comprises polyether having a repeating unit expressed by the general formula (54), $$—R^{5\prime}—O— \quad (54)$$

(wherein $R^{5\prime}$ denotes an alkylene group of 2 to 10 carbons).

(3) A production method of ester elastomer according to the above (1), wherein the polymeric component (T) comprises aliphatic polyester having a repeating unit expressed by the general formula (55), $$—R^{6\prime}—O—CO—R^{7\prime}—CO—O— \quad (55)$$

(wherein $R^{6\prime}$ and $R^{7\prime}$ denote, same or differently, alkylene group of 2 to 10 carbons).

(4) A production method of ester elastomer according to the above (1), wherein the polymeric component (T) comprises polylactone having a repeating unit expressed by the general formula (56), $$—R^{8\prime}—CO—O— \quad (56)$$

(wherein $R^{8\prime}$ denotes an alkylene group of 2 to 10 carbons).

(5) A production method of ester elastomer according to the above (1), wherein the polymeric component (T) comprises a polycarbonate having a a repeating unit expressed by the general formula (57), $$—R^{9\prime}—O—CO—O— \quad (57)$$

(wherein $R^{9\prime}$ denotes an alkylene group of 2 to 10 carbons).

(6) An ester elastomer produced by the production method for the ester elastomer according to the above (1) through (5).

(7) A production method of amide elastomer, wherein a polyamide component (P) and the polymeric component (T) possessing hydroxyl group at the two molecular terminals are combined through an isocyanate component (Q) to form an amide block copolymer, in which the isocyanate component is expressed by the general formula (58), $$—O—CO—NH—R^{10\prime}—NH—CO—O— \quad (58)$$

(wherein $R^{10\prime}$ denotes an alkylene group of 2 to 15 carbons, $—C_6H_4—$ (phenylene group), $—C_6H_4—CH_2—$, or $—C_6H_4—CH_2—C_6H_4—$), or by the general formula (59), $$—O—CO—NH—R^{11\prime}—NH—CO—NH— \quad (59)$$

(wherein $R^{11\prime}$ denotes an alkylene group of 2 to 15 carbons, $—C_6H_4—$ (phenylene group), $—C_6H_4—CH_2—$, or $—C_6H_4—CH_2—C_6H_4—$), the polyamide component (P) comprises a repeating unit expressed by the general formula (60), $$—CO—R^{12\prime}—CO—NH—R^{13\prime}—NH— \quad (60)$$

(wherein $R^{12\prime}$ and $R^{13\prime}$ denote, same or differently, alkylene group of 2 to 12 carbons), or a repeating unit expressed by the general formula (61), $$—CO—R^{14\prime}—NH— \quad (61)$$

(wherein $R^{14\prime}$ denotes an alkylene group of 2 to 12 carbons), the polymeric component (T) possessing hydroxyl group at the two molecular terminals has the glass transition temperature is not more than 20° C. and the number-average molecular weight in the range from 500 to 5,000; the amide elastomer comprises 50 to 2,000 parts by weight of the polymeric component (T) possessing hydroxyl group at the two molecular terminals and 10 to 100 parts by weight of the isocyanate component (Q) relative to 100 parts by weight of the polyamide component (P), and the production method of the amide elastomer comprises the following two processes; i) production of prepolymer by reacting the polymeric component (T) possessing hydroxyl group at the two molecular terminals with a diisocyanate compound (Q') and ii) the process of reacting the above prepolymer with the polyamide component (P).

(8) A production method of amide elastomer according to the above (7) wherein the polymeric component (T) comprises polyether having a repeating unit expressed by the general formula (54), $$-R^{5'}-O-\qquad(54)$$

(wherein $R^{5'}$ denotes an alkylene group of 2 to 10 carbons).

(9) A production method of amide elastomer according to the above (7) wherein the polymeric component (T) comprises aliphatic polyester having a repeating unit expressed by the general formula (55), $$-R^{6'}-O-CO-R^{7'}-CO-O-\qquad(55)$$

(wherein $R^{6'}$ and $R^{7'}$ denote, same or differently, alkylene group of 2 to 10 carbons).

(10) A production method of amide elastomer according to the above (7), wherein the polymeric component (T) comprises polylactone having a repeating unit expressed by the general formula (56), $$-R^{8'}-CO-O-\qquad(56)$$

(wherein $R^{8'}$ denotes an alkylene group of 2 to 10 carbons).

(11) A production method of amide elastomer according to the above (7), wherein the polymeric component (T) comprises polycarbonate having a repeating unit expressed by the general formula (57), $$-R^{9'}-O-CO-O-\qquad(57)$$

(wherein $R^{9'}$ denotes an alkylene group of 2 to 10 carbons).

(12) An amide elastomer produced by the production method for the amide elastomer according to the above (7) through (11). In the present invention, the polyester component (S) comprises a repeating unit expressed by the general formula (53), $$-CO-R^{3'}-CO-O-R^{4'}-O-\qquad(53)$$

(wherein $R^{3'}$ denotes a divalent aromatic hydrocarbon group of 6 to 12 carbons, and $R^{4'}$ denotes an alkylene group of 2 to 8 carbons).

The above polyester component (S) may be obtained by the reaction of an aromatic dicarboxylic acid or its ester derivative with a low-molecular diol.

The above aromatic dicarboxylic acid or its ester derivative is not limited in any manner. Examples of them include terephthalic acid, isophthalic acid, orthophthalic acid, naphthalene dicarboxylic acid, paraphenylene dicarboxylic acid, dimethyl terephthalate, dimethyl isophthalate, dimethyl orthophthalate, naphthalene dicarboxylic acid dimethyl ester, and paraphenylene dicarboxylic acid dimethyl ester. They may be employed singly or in mixed form of more than two kinds. Among them naphthalene dicarboxylic acid and naphthalene dicarboxylic acid dimethyl ester are most preferable as the settling resistance at high temperatures for the ester elastomer according to the present invention is significantly improved using these compounds.

Examples of the above low-molecular diol include, though not limited to the examples in any manner, ethylene glycol, 1,2-propanediol, 1,3-propanediol, 1,3-butanediol, 1,4-butane diol, neopentyl glycol, 1, 5-pentane diol, and 1,6-hexane diol. They may be employed singly or in mixed form of more than two kinds.

Polymerization of the above polyester component (S) may be conducted by using known methods. For example, dimethyl terephthalate may be heated with an excess amount of low-molecular diol at 200° C. in the presence of catalysts for the ester interchange reaction, followed by the condensation reaction at 240° C. under a reduced pressure to yield the polyester component (S).

In the polymerization reaction for obtaining the above polyester component (S), polyols that have hydroxyl group at the two molecular terminals can be used, which improves the compatibility with the polymeric component (T) that has also hydroxyl group at the two molecular terminals.

The polyols are not limited in any manner. But they have preferably the glass transition temperature of not more than 20° C. and the number-average molecular weight of 500 to 5,000. Examples of such polyols are polyethers, aliphatic polyesters, polylactones, or polycarbonates. Among them most preferably used are polyols that have a component similar to the employed polymeric component (T).

The content of polyols that have hydroxyl group at the two molecular terminals in the above polyester component (S) is not limited in any manner, but is preferably 5 to 50 weight % of the above polyester component (S). When the content is less than 5 weight %, the effect of improving the compatibility with the polymeric component (T) is diminished. When the content is larger than 50 weight %, the melting point of the obtained polyester component (S) is lowered giving a bad influence on the mechanical strength of the ester elastomer at high temperatures. The content is most preferably in the range from 10 to 30 weight %.

The range of the number-average molecular weight of the above polyester component (S) is not limited in any manner, but preferably is 50 to 5,000. When the molecular weight is less than 500, the block property of the ester elastomer is decreased giving a bad influence on the mechanical strength at high temperatures. When the molecular weight is larger than 5,000, the compatibility with the polymeric component (T) is diminished, leading to smaller polymerization degrees for the obtained ester elastomer, which results in the elastomer with insufficient mechanical strength. The molecular weight is more preferably in the range from 1,000 to 3,000.

The intrinsic viscosity of the above polyester component is not limited in any manner, but is preferably 0.05 to 0.5. When the intrinsic viscosity is less than 0.05, the block property of the ester elastomer is decreased, giving a bad influence on the mechanical strength at high temperatures. When the intrinsic viscosity is larger than 0.5, the compatibility with the polymeric component (T) is diminished, leading to smaller polymerization degrees for the obtained ester elastomer, which results in the elastomer with insufficient mechanical strength. The intrinsic viscosity is more preferably in the range from 0.1 to 0.3. In the present patent specification, the intrinsic viscosity means a value measured at 25° C., employing ortho-chlorophenol as the solvent.

In the present invention, the polymeric component (T) that has hydroxyl group at the two molecular terminals is defined to have the glass transition temperature of less than 20° C. and the number average molecular weight in the range from 500 to 5,000. When the glass transition temperature is higher than 20° C. for the above polymeric component (T), the obtained ester elastomer becomes hard, and does not exhibit excellent rubber elasticity. The glass transition temperature is preferably less than 0° C., more preferably less than −20° C.

When the number-average molecular weight of above polymeric component (T) is less than 500, the obtained ester elastomer loses sufficient flexibility. When the number-average molecular weight is above 5,000, the obtained elastomer loses enough reactivity with the diisocyanate compound (U') leading to lower degrees of polymerization and insufficient mechanical strength of the obtained ester elastomer. The number-average molecular weight is preferably in the range from 500 to 3,000, more preferably in the range from 500 to 2,000.

The polymeric component (T) is not limited in any manner as long as the aforementioned conditions are satisfied. The preferred examples include polyethers, polylactones, aliphatic polyesters, polycarbonates, polyolefins, polybutadiene, polyisoprene, polyacrylates, and polysiloxanes. Among them, polyethers, polylactones, aliphatic polyesters, polycarbonates are more preferable due to their excellent reactivity.

The preferred species of polyether for the above polymeric component (T) is not limited in any manner, but preferably it is a polyether comprising a repeating unit expressed by the following general formula (54), $$-R^{5'}-O- \quad (54)$$

(wherein $R^{5'}$ denotes an alkylene group of 2 to 10 carbons).

The polyether for the above polyether comprising a repeating unit expressed by the general formula (54) is not limited in any manner. Examples of them include polyethylene glycol, poly-1,3-propylene glycol, poly-1,2-propylene glycol, polytetramethylene glycol, polyhexamethylene glycol. Among them preferably used is polytetramethylene glycol, as it has excellent mechanical properties and weather resistance. Examples of its commercial products are "PTHF" (trade name) produced by BASF and "PTMG" (trade name) produced by Mitsubishi Chemical.

The number-average molecular weight of the above polyether is preferably in the range from 500 to 5,000. With the number-average molecular weight of less than 500, the obtained ester elastomer loses sufficient flexibility. With the number-average molecular weight above 5,000, the obtained elastomer loses enough reactivity with the diisocyanate compound (U'), leading to lower degrees of polymerization and insufficient mechanical strength for the obtained ester elastomer. The number-average molecular weight is more preferably in the range from 500 to 3,000 and most preferably in the range from 500 to 2,000.

The aliphatic polyester for the above polymeric component (T) is not limited in any manner, but preferably it is an aliphatic polyester comprising a repeating unit expressed by the following general formula (55), $$-R^{6'}-O-CO-R^{7'}-CO-O- \quad (55)$$

(wherein $R^{6'}$ and $R^{7'}$ denote, same or differently, alkylene group of 2 to 10 carbons).

The aliphatic polyester comprising a repeating unit expressed by the following general formula (55) is not limited in any manner, and may be prepared by the polycondensation reaction of aliphatic dicarboxylic acid and aliphatic diol. The above aliphatic dicarboxylic acid is not limited in any manner. Examples of them include oxalic aid, malonic acid, succinic acid, glutaric acid, adipic acid, pimelic acid, suberic acid, azelaic acid, and sebacic acid. It is also possible to add other dicarboxylic acids as long as the physical property of the molded product obtained by the ester elastomer is not impaired by the addition. They may be employed singly or in mixed form of more than two kinds.

The above aliphatic diol is not limited in any manner. Examples of them include ethylene glycol, 1,2-propane diol, 1,3-propane diol, 1,3-butane diol, 1,4-butane diol, neopentyl glycol, 1,5-pentane diol, and 1,6-hexane diol. It is also possible to add other diols as long as the physical property of the molded product obtained by the ester elastomer is not impaired by the addition. They may be employed singly or in mixed form of more than two kinds.

Examples of its commercial product are "Nippolan 4009", "Nipponlan 4010", and "Nippolan 4070" (all are trade names) produced by Nippon Polyurethane Co.

The number-average molecular weight of the above aliphatic polyester is preferably in the range from 500 to 5,000. When the number-average molecular weight is less than 500, the obtained ester elastomer loses sufficient flexibility. When the number-average molecular weight is above 5,000, the obtained elastomer loses enough reactivity with the diisocyanate compound (U') leading to lower degrees of polymerization and insufficient mechanical strength for the obtained ester elastomer. The number-average molecular weight is more preferably in the range from 500 to 3,000 and most preferably in the range from 500 to 2,000.

The polylactone for the above polymeric component (T) is not limited in any manner, but preferably it is a polylactone comprising a repeating unit expressed by the following general formula (56), $$-R^{8'}-CO-O- \quad (56)$$

(wherein $R^{8'}$ denotes an alkylene group of 2 to 10 carbons).

The polylactone comprising a repeating unit expressed by the above general formula (56) is not limited in any manner, and may be prepared by the ring-opening polymerization reaction of lactones.

The above lactone is not limited in any manner. The preferred examples are lactones of 3 to 10 carbons. Among them caprolactone is particularly preferable. They may be employed singly or in mixed form of more than two kinds. The examples of its commercial product are "TONE Polyol" (trade name) produced by Union Carbide Co, and so on.

The number-average molecular weight of the above polylactone is preferably in the range from 500 to 5,000. When the number-average molecular weight is less than 500, the obtained ester elastomer loses sufficient flexibility. When the number-average molecular weight is above 5,000, the obtained elastomer loses enough reactivity with the diisocyanate compound (U') leading to lower degrees of polymerization and insufficient mechanical strength for the obtained ester elastomer. The number-average molecular weight is more preferably in the range from 500 to 3,000 and most preferably in the range from 500 to 2,000.

The polycarbonate for the above polymeric component (T) is not limited in any manner, but preferably it is a polycarbonate comprising a repeating unit expressed by the following general formula (57), $$-R^{9'}-O-CO-O- \quad (57)$$

(wherein $R^{9'}$ denotes an alkylene group of 2–10 carbons).

The polycarbonate comprising a repeating unit expressed by the above general formula (57) is not limited in any manner, and may be prepared by the ring-opening polymerization reaction of aliphatic carbonates.

The above aliphatic carbonate is not limited in any manner. The preferred examples are aliphatic carbonates of 4 to 10 carbons. Among them propylene carbonate, tetramethylene carbonate, and hexamethylene carbonate are preferable. The examples of commercial product for the above polycarbonate are "Nippolan 981" (trade name) produced by Nippon Plyurethance Co, and so on.

The number-average molecular weight of the above polycarbonate is preferably in the range from 500 to 5,000. When the number-average molecular weight is less than 500, the obtained ester elastomer loses sufficient flexibility. When the number-average molecular weight is above 5,000, the obtained elastomer loses enough reactivity with the diisocyanate compound (U') leading to lower degrees of polymerization and insufficient mechanical strength for the obtained ester elastomer. The number-average molecular weight is more preferably in the range from 500 to 3,000 and most preferably in the range from 500 to 2,000.

The ester elastomer according to the present invention is defined as the block-copolymer of the above polyester component (S) and the polymeric component (T) possessing hydroxyl group at the two molecular terminals, which are connected with the isocyanate component (U).

To obtain the above ester elastomer by reacting the polyester component (S) and the polymeric component (T) with the isocyanate compound (U') having hydroxyl group at the two molecular terminals, the polyester component (S) and the polymeric component (T) having hydroxyl group at the two molecular terminals should be reacted with the diisocyanate compound (U') expressed by the general formula (62).

Usually the above polyester component (S) and the polymeric component (T) possess hydroxyl group at their two molecular terminals. But they may be substituted with carboxyl group partly. When the two functional groups of the two components reacting with the diisocyanate compound (U') are both hydroxyl group, the two components may be connected with the isocyanate component (U) expressed by the following general formula (51). When one functional group is hydroxyl group and the other functional group is carboxyl group, they are connected with the isocyanate component (U) expressed by the general formula (52).

When one functional group is carboxyl group and the other is also carboxyl group of polyester component (S) and polymeric component (T), they may contain a fragment connected with the isocyanate component, which is expressed by the following general formula (63),

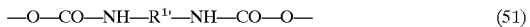

—O—CO—NH—R$^{1'}$—NH—CO—O— (51)

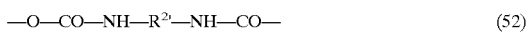

—O—CO—NH—R$^{2'}$—NH—CO— (52)

—OCN—R$^{15'}$—NCO— (62)

—CO—NH—R$^{16'}$—NH—CO— (63)

In these formula (51), (52), (62) and (63), R$^{1'}$, R$^{2'}$, R$^{15'}$ and R$^{16'}$ denote an alkylene group of 2 to 15 carbons, —C$_6$H$_4$— (phenylene group), —C$_6$H$_4$—CH$_2$—, or —C$_6$H$_4$—CH$_2$—C$_6$H$_4$—) group. Also, R$^{1'}$, R$^{2'}$, R$^{15'}$ and R$^{16'}$ may be a composite functional group of the above groups.

The structure of the above diisocyanate compound (U') is not limited in any manner as long as it has two isocyanate groups in a single molecule. It is also possible to employ other compounds possessing more than three isocyanate groups in one molecule as long as the flowability of the obtained ester elastomer is kept within a normal range. They may be used singly or in mixed form of more than two kinds.

Examples of the above diisocyanate compound (U') are aromatic diisocyanates such as 4,4'-diphenylmethane diisocyanate, tolylene diisocyanate, phenylene diisocyanate, naphthalene diisocyanate, and so on; aliphatic diisocyanates such as 1,2-ethylene diisocyanate, 1,3-propylene diisocyanate, 1,4-butane diisocyanate, 1,6-hexamethylene diisocyanate; 1,4-cyclohexane diisocyanate, 1,3-cyclohexane diisocyanate, isophorone diisocyanate, hydrogenated 4,4'-diphenyl-methane diisocyanate, and so on.

The ester elastomer according to the present invention comprises 50 to 2,000 parts by weight of the polymeric component (T), and 10 to 100 parts by weight of the isocyanate component (U) relative to 100 parts by weight of the polyester component (S).

When the polymeric component (T) is less than 50 parts by weight, the obtained ester elastomer loses sufficient flexibility. When the polymeric component (T) is more than 2,000 parts by weight, the obtained ester elastomer loses sufficient mechanical strength. The content is preferably in the range from 200 to 1,000 parts.

When the isocyanate component (U) is less than 10 parts by weight, the obtained ester elastomer does not reach the sufficient molecular weight leading to inferior mechanical strength. With the isocyanate component (U) is more than 100 parts by weight, the obtained ester elastomer loses sufficient flexibility. The content is preferably in the range from 30 to 70 parts.

The production method of ester elastomer according to the present invention comprises the following two-step processes; ① The production process of prepollymer by reacting the polymeric component (T) possessing hydroxyl group at the two molecular terminals with the diisocyanate compound (U') ② The process of reacting above prepolymer with the polyester component (S). The advantages Features of the above production method according to the present invention are as follows;

(1) Usually different polymeric components are not mutually compatible, so it is difficult to react with each other. When the polymeric component (T) and the polyester component (S) are reacted simultaneously with the diisocyanate compound (U'), the simultaneous reaction of the three components does not yield block copolymer, but yield a blended mixture of polyester and polymer. Instead, the polymeric component (T) or the polyester component (S) extends predominantly with the diisocyanate compound (U'). According to the present invention, however, the terminal isocyanate group in the prepolymer comprising the polymeric component (T) can be reacted securely with the polyester component (S), yielding the block copolymer. In order to enhance the reactivity in this case, the reaction apparatus and the reaction temperature are the critical factors.

(2) In the next process, an excess molar amount of the polyester component (S) is reacted with prepolymer. This effects yield block copolymers, of which the molecular terminal is sealed with the hard segment, that is the polyester component.

The physical property of the product thus obtained as an elastomer varies to a large extent depending on the terminal kinds of the block copolymer. When the terminal is the soft segment of the polymeric component (T), this segment does not only contribute to the expression of rubber elasticity, but also lowers the melting point of the crystalline hard segment, inducing inferior creep resistance and mechanical strength at high temperatures. When the terminal is the hard segment, on the other hand, it will improve the creep resistance and mechanical strength at high temperatures. The production method of thermoplastic elastomer according to the present invention is specifically suited for obtaining block copolymers, of which the molecular terminal is sealed with the hard segment that is expected to improve the creep resistance and mechanical strength at high temperatures.

The illustrative embodiments of the production method according to the present invention are described hereinafter in detail.

In the above first process, it is preferable to react the polymeric component (T) with an excess amount of the diisocyanate compound (U'). The molar ratio of the diisocyanate compound (U') to the polymeric component (T) is most preferably in the range from 1.1 to 2.2 times. With the ratio less than 1.1 times, the two molecular terminals of the obtained prepolymer are not completely converted to isocyanate group, which may inhibit the reaction in the second process. With the ratio exceeding 2.2 times, a part of the diisocyanate compound (U') is left unreacted after the reaction, which may cause side reactions in the second process. The molar ratio is more preferably in the range from 1.2 to 2.0 times.

The reaction temperature in the above first process is preferably in the range from to 100 to 240° C. With the temperature below 100° C., the reaction may not proceed sufficiently. With the temperature exceeding 240° C., the polymeric component (T) starts to decompose. The reaction temperature is more preferably in the range from 120 to 160° C.

In the above second process, the obtained prepolymer is reacted with the polyester component (S) with a molar ratio of 0.9 to 3.0 times. In order to obtain block copolymers, of which the molecular terminals are sealed with the hard segment of polyester, the prepolymer may be reacted preferably with an excess molar amount of the polyester component (S). Particularly, the molar ratio of the polyester component (S) to the prepolymer is preferably in the range from 1.2 to 3.0 times. With the molar ratio less than 1.2 times, the reaction may partly yield block copolymers having the soft segment in the molecular terminal. With the molar ratio exceeding 3.0, the flexibility of the obtained ester elastomer becomes inferior. The molar ratio is more preferably in the range from 1.25 to 2.0 times.

It is possible to control the structure of the obtained block copolymers by changing the composition ratio of the polyester component (S) and the polymeric component (T). If the hard segment is referred to as A and the soft segment is referred to as B, block copolymers of ABA type are obtained when the molar ratio of the polyester component (S) to the prepolymer is 2.0 times. When the molar ratio of the polyester component (S) to the prepolymer is 1.5 times, block copolymers of ABABA type are obtained. When the molar ratio of the polyester component (S) to the prepolymer is 1.25 times, furthermore, block copolymers of ABABA-BABA type are obtained.

The ester elastomer having significantly improved creep resistance and mechanical strength at high temperatures may be prepared by reacting a block copolymer, of which the two molecular terminals are sealed with the hard segment of the polyester component, with the diisocyanate compound (U'). Then it is followed by further molecular weight treatment. This yields a block copolymer having excellent creep resistance and mechanical strength at high temperatures.

If the molecular terminals of the hard segment are not the requisite, it is preferable, for obtaining the ester elastomer of high molecular weight, to react the prepolymer with the polyester component (S) at a molar ratio of 0.9 to 1.2 times. With the molar ratio off the range, it becomes difficult to raise the molecular weight.

In the case where the two molecular terminals of the prepolymer employed in the second process are not completely converted to isocyanate group, the ester elastomer with high molecular weight may be obtained by the following method. The polyester component (S) is first reacted with an excess molar amount of diisocyanate compound (U'), yielding another polyester compound (S) having isocyanate group at the two molecular terminals. Then this product is further reacted with the above prepolymer to give the ester elastomer with high molecular weight. In the above series of reactions, the molar amount of diisocyanate compound (U') is preferably in the range from 0.9 to 1.2 times to the sum of the polymeric component (T) and the polyester component (S). With the molar ratio off the range, it becomes difficult to raise the molecular weight.

In the above second process, the reaction temperature is preferably in the range from 180 to 260° C. With the temperature below 180° C., the polyester component does not completely melt-down. As a result the reaction does not proceed smoothly, leading to decreased molecular weight for the obtained product. With the temperature exceeding 260° C., the prepolymer and the diisocyanate compound (U') starts to decompose, giving polymers with insufficient mechanical strength. The reaction temperature is more preferably in the range from 200 to 240° C.

It is possible to employ catalysts for the above reaction in the production method according to the present invention. Examples of the above catalysts are diacyl tin (II), tetraacyl tin (IV), dibutyl tin oxide, dibutyl tin dilaurate, dimethyl tin malate, tin dioctanoate, tin tetraacetate, triethylene amine, diethylene amine, triethyl amine, metal salts of naphthenic acid, metal salts of octanoic acid, triisobutyl aluminum, tetrabutyl titanate, calcium acetate, germanium dioxide, antimony trioxide and so on. They may be used singly or in combination of more than two kinds.

The above reaction is preferably carried out in bulk. With this reaction method, the reactivity of the second process may be significantly improved. With regard to the reaction apparatus, an extruder may be employed.

As above extruder, a bi-axial extruder wherein two axes rotate in the same direction is preferable. With this extruder, the reactivity, especially the reactivity of the second step can be improved. A tandem extruder is preferably employed for carrying out the first process and the second process continuously.

It is possible to use stabilizers in the production method according to the present invention. It is also possible to add stabilizers to the ester elastomer produced by the production method of the ester elastomer according to the present invention. Examples of the stabilizers include hindered phenol antioxidants such as 1,3,5-trimethyl-2,4,6-tris(3,5,-di-t-butyl-4-hydroxybenzyl) benzene, 3,9-bis{2-[3-(3-t-butyl-4-hydroxy-5-methylphenyl)-propionyl oxy]-1,1-dimethylethyl}-2,4,8,10-tetraoxaspiro[5,5] undecane, and the like; thermal stabilizers such as tris(2,4-di-t-butylphenyl) phosphate, trilauryl phosphite, 2-t-butyl-alpha-(3-t-butyl-4-hydroxyphenyl)-p-cumenyl-bis(p-nonylphenyl) phosphite, dimiristyl-3,3'-thiodipropionate, distearyl-3,3'-thiodipropionate, pentaerystyryl tetraxis (3-lauryl-thiopropionate), ditridecyl-3,3'-thiodipropionate, and so on. They may be used singly or in mixed form of more than two kinds.

The part II of the present invention relates to an ester elastomer produced by the production method according to the part I of the present invention.

The ester elastomer according to the part II of the present invention is produced by the production method according to the part I of the present invention. It exhibits high block property for the hard segment component and the soft segment component as well as the excellent flexibility and the mechanical characteristics at high temperatures, including especially the settling property at high temperatures.

During or after the production, it is also possible to add additives including fibers, inorganic fillers, flame retardants, UV light absorbers, anti-static agents, inorganic substances, and salts of higher fatty acids to the ester elastomer according to the part II of the present invention as long as the practicality of the elastomer is not impaired. They may be used singly or in mixed form of more than two kinds.

Examples of the above fibers are not limited to the examples specifically, but include inorganic fibers such as glass fibers, carbon fibers, boron fibers, silicon carbide fibers, alumina fibers, amorphous fibers, inorganic fibers made of silicon, titanium, or carbon, and organic fibers such as Aramid. Examples of the above inorganic fillers are, though not limited to the examples, calcium carbonate, titanium oxide, mica, and talc.

Examples of the above flame retardants are, though not limited to the examples, but include hexabromo-cyclododecane, tris(2,3-dichloropropyl) phosphate, pentabromo-phenyl-allyl ether, and so on.

Examples of the above UV light absorbers are, though not limited to the examples, but include p-t-butylphenyl salicylate, 2-hydroxy-4-methoxybenzophenone, 2-hydroxy-4-methoxy-2'-carboxybenzophenone, 2,4,5-trihydroxy-butylophenone, and so on.

Examples of the above anti-static agents are, though not limited to the examples, but include N,N-bis (hydroxyethyl)-alkyl amine, alkylaryl sulfonates, alkyl sulfonates, and so on.

Examples of the above inorganic substances are, though not limited to the examples, but include barium sulfate, alumina, silicon oxide, and so on.

Examples of the above salts of higher fatty acids are, though not limited to the examples, but include sodium stearate, barium stearate, sodium palmitate, and so on.

The ester elastomer according to the part II of the present invention may be modified of its properties by blending other thermoplastic resins, rubber components, or the like. Examples of such thermoplastic resins are, though not limited to the examples, but include polyolefin, modified polyolefin, polystyrene, polyvinyl chloride, polyamide, polycarbonate, polysulfone, and polyester.

Examples of such rubber components are, though not limited to the examples, but include natural rubber, styrene-butadiene copolymers, polybutadiene, polyisoprene, acrylonitrile-butadiene copolymers, ethylene-propylene copolymers (EPM, EPDM), polychroloprene, butyl rubber, acryl rubber, silicon rubber, urethane rubber, olefin thermoplastic elastomers, styrene thermoplastic elastomers, PVC thermoplastic elastomers, ester thermoplastic elastomers, amide thermoplastic elastomers, and so on.

The ester elastomer according to the part II of the present invention may be shaped to molded products using conventional methods such as press molding, extrusion molding, injection molding, or blow molding. The molding temperature varies depending on the melting point of the employed elastomer as well as the molding method, but preferably it is in the range from 160 to 280° C. With the molding temperature lower than 160° C., the flowability of the ester elastomers becomes inferior, leading to non-homogeneous molded products. With the molding temperature higher than 280° C., on the other hand, the obtained elastomer starts to decompose, yielding products with insufficient mechanical strength.

The molded products made from ester elastomer according to the part II of the present invention may be favorably employed for molded parts of automobile, electric and electronic parts, industrial parts, sport goods, medical goods, and so on.

Examples of the above automobile parts are not limited specifically, but include boots such as equal-speed joint boots, rack and pinion boots; ball joint seals; safety belt parts; bumper facias; emblems; and molls.

Examples of the above electric and electronic parts are, though not limited to the examples, but include cable-covering materials, gears, rubber switches, membrane switches, tact switches, and O-rings.

Examples of the above industrial parts are, though not limited to the examples, but include oil pressure hoses, coil tubes, sealing parts, packings, V-belts, rolls, anti-vibration materials, shock absorbers, couplings, diaphrams, and binders for bonded magnets.

Examples of the sport goods are, though not limited to the examples, but include sole of shoe and balls for ball games. Examples of the above medical goods are, though not limited to the examples, but include containers such as infusion bags and blood transfusion bags; tubes including infusion set tubes, blood transfusion system tubes, and catheters; and the stoppers themselves.

In addition, the thermoplastic elastomer according to the part II of the present invention may be favorably employed for the raw material of elastomer fibers, elastomer sheets, composite sheets, films, composite films, form, hot-melt adhesives, binders, polymer-alloys together with other plastic resins, and so on.

The thermoplastic elastomer according to the part II of the present invention has excellent elasticity and physical properties at high temperatures owing to the following reasons. Usually different polymeric components are not mutually compatible, and difficult to react with each other. But the polymeric component (T) belonging to the soft segment component and the polyester component (S) belonging to the hard segment component can bond with each other by controlling the reaction with the diisocyanate compound (Q'). As a result, an ester elastomer of very high block property concerning the hard segment component and the soft segment component may be produced. The ester elastomer exhibits its character as an elastomer by forming cross-linked points in the crystalline polyester component.

Since the ester elastomer according to the part II of the present invention comprises the polyester-rich segment and soft-rich segment, the polyester component is to crystallize more easily than ordinary ester elastomers having a similar elasticity. As a result, rigid cross-linking points are formed, producing elastomer materials having superior mechanical characteristics at high temperatures. The presence of a section of soft-rich segment increases the average molecular weight between cross-linking points. This leads to elastomer materials having superior elasticity.

The part III of the present invention relates to a production method of amide elastomer. It yields amide elastomers, in which the block copolymers comprising the above polyamide component (P) and the polymeric component (T) possessing hydroxyl group at the two molecular terminals are connected through the isocyanate component (Q) expressed by the general formula (58),

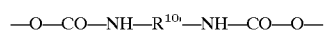

—O—CO—NH—$R^{10}$—NH—CO—O—   (58)

(wherein $R^{10'}$ denotes an alkylene group of 2 to 15 carbons, —$C_6H_4$— (phenylene group), —$C_6H_4$—$CH_2$—, or —$C_6H_4$—$CH_2$—$C_6H_4$—) or by the general formula (59), $$—O—CO—NH—R^{11'}—NH—CO—NH— \quad (59)$$

(wherein $R^{11'}$ denotes an alkylene group of 2 to 15 carbons, —$C_6H_4$— (phenylene group), —$C_6H_4$—$CH_2$—, or —$C_6H_4$—$CH_2$—$C_6H_4$—); the polyamide component (P) comprises a repeating unit expressed by the general formula (60), $$—CO—R^{12'}—CO—NH—R^{13'}—NH— \quad (60)$$

(wherein $R^{12'}$ and $R^{13'}$ denote, same or differently, alkylene group of 2 to 12 carbons), or a repeating unit expressed by the general formula (61), $$—CO—R^{14'}—NH— \quad (61)$$

(wherein $R^{14'}$ denotes an alkylene group of 2 to 12 carbons); the polymeric component (T) possessing hydroxyl group at the two molecular terminals has the glass transition temperature of not more than 20° C. and the number-average molecular weight in the range from 500 to 5,000; and the amide elastomer comprises 50 to 2,000 parts by weight of the polymeric component (T) possessing hydroxyl group at the two molecular terminals and 10 to 100 parts by weight of the isocyanate component (Q) relative to 100 parts by weight of the polyamide component (P). The amide elastomer may be produced in the following two processes; ① Production of prepolymer by reacting the polymeric component (T) possessing hydroxyl group at the two molecular terminals with the diisocyanate compound (Q'), and ② Process of reacting the above prepolymer with the polyamide component (P).

In the part III of the present invention, the polyamide component (P) comprises a repeating unit expressed by the general formula (60), $$—CO—R^{12'}—CO—NH—R^{13'}—NH— \quad (60)$$

(wherein $R^{12'}$ and $R^{13'}$ denote, same or differently, alkylene group of 2 to 12 carbons), or a repeating unit expressed by the general formula (61), $$—CO—R^{14'}—NH— \quad (61)$$

(wherein $R^{14'}$ denotes an alkylene group of 2 to 12 carbons).

The above polyamide component (P) may be obtained by the polycondensation of diamine with dicarboxylic acid, or by the ring-opening polymerization of lactam.

Examples of the above diamine are, though not limited to the examples, but include ethylenediamine, tetramethylenediamine, hexamethylenediamine, octamethylenediamine, decamethylenediamine, dodecamethylenediamine, and the like. They may be employed singly or in mixed form of more than two kinds.

Examples of the above dicarboxylic acid are, though not limited to the examples, but include oxalic acid, malonic acid, succinic acid, glutaric acid, adipic acid, pimelic acid, suberic acid, azelaic acid, and sebacic acid. It is also possible to add other dicarboxylic acids as long as the physical property of the molded product by the obtained amide elastomer is not impaired by the addition. They may be employed singly or in mixed form of more than kinds.

Examples of the above lactam are, though not limited to the examples, but include valerolactam, caprolactam, dodecalactam, and soon. They may be employed singly or in mixed form of more than two kinds.

It is possible to polymerize the above polyamide component (P) by known methods. For example, hexamethylenediamine is heated with an equimolar amount of dicarboxylic acid at 260° C. in the presence of catalysts for the polycondensation reaction, yielding the polyamide component (P). Or ε-caprolactam is heated at 260° C. in the presence of catalysts for the ring-opening polymerization to yield the polyamide component (P).

Examples of the polyamide component (P) obtained by the above methods are, though not limited to the examples, but include 4-nylon, 6-nylon, 6,6-nylon, 11-nylon, 12-nylon, 6,10-nylon, 6,12-nylon and so on.

In the above polymerization for obtaining the polyamide component (P), it is possible to add polyols having hydroxyl group at the two molecular terminals in order to improve the compatibility with the polymeric component (T) possessing hydroxyl group at the two molecular terminals.

Examples of such polyols are, though not limited to the examples, but preferable is the polyol with number-average molecular weight in the range from 500 to 5,000 and their glass transition temperature of not more than 20° C. Examples are polyols, including for example, polyesters, aliphatic polyesters, polylactones, polycarbonates, and so on. Among them a polyol having a similar composition to the polymeric component (T) is particularly preferred.

The content of polyol having hydroxyl group at the two molecular terminals in the above polyamide component (P) is not particularly limited, but preferably is in the range from 5 to 50 weight % of the above polyamide component (P). With the content below 5%, the effect of improving compatibility with the polymeric component (T) is decreased. With the content exceeding 50 weight %, the melting point of the obtained polyamide component (P) is lowered, giving a bad influence on the mechanical strength of the amide elastomer at high temperatures. The content is most preferably in the range from 10 to 30 weight %.

The number-average molecular weight of the above polyamide component (P) is not limited in any manner, but preferably is in the range from 500 to 5,000. With the molecular weight less than 500, the block property of the amide elastomer is decreased giving a bad influence on the mechanical strength at high temperatures. With the molecular weight exceeding 5,000, the compatibility with the polymeric component (T) is diminished, leading to smaller polymerization degrees for the obtained amide elastomer, which results in the elastomer with insufficient mechanical strength. The molecular weight is more preferably in the range from 1,000 to 3,000.

The intrinsic viscosity of the above polyamide component (P) is not limited in any manner, but preferably is 0.05 to 0.5. With the intrinsic viscosity less than 0.05, the block property of the amide elastomer is decreased, giving a bad influence on the mechanical strength at high temperatures. With the intrinsic viscosity larger than 0.5, the compatibility with the polymeric component (T) is diminished, leading to smaller polymerization degrees for the obtained amide elastomer, which results in the elastomer with insufficient mechanical strength. The intrinsic viscosity is more preferably in the range from 0.1 to 0.3.

In the part III of the present invention, the polymeric component (T) having hydroxyl group at the two molecular terminals is defined to have the glass transition temperature of not more than 20° C. and the number-average molecular weight in the range from 500 to 5,000. An example of such polymeric component (T) is the one similar to the example in part I of the present invention.

The amide elastomer according to the part III of the present invention is defined as the block-copolymer of the above polyamide component (P) and the polymeric component (T) possessing hydroxyl group at the two molecular terminals, which are connected with the isocyanate component (Q).

In order to obtain the above amide elastomer, which is block copolymer, produced by binding above polyamide component (P) with the polymeric component (T) possessing hydroxyl group at the two molecular terminals with the diisocyanate (Q), the polyamide component (P) and the polymeric component (T) possessing hydroxyl group at the two molecular terminals bind with each other by the diisocyanate compound (Q') expressed by the general formula (64).

Usually the above polyamide component (P) may preferably contain amino group at the two molecular terminals, but may contain carboxyl group or amino group partly. The above polymeric component (T) contains hydroxyl group at the two molecular terminals usually, but may contain carboxyl group or amino group partly. When the two molecular terminals of the two components reacting with the diisocyanate compound (Q') are both hydroxyl group, the two components may be connected with the isocyanate component (Q) expressed by the following general formula (58). When one molecular end is hydroxyl group and the other end is amino group, on the other hand, they are connected with the isocyanate component (Q) expressed by the general formula (59). In the latter case the elastomer may contain a fragment connected with the isocyanate component expressed by the following general formula (59).

When the two molecular terminals for the polyamide component (P) and the polymeric component (T) both comprise amino group, the elastomer may contain a small portion in which the two components are connected with each other by the isocyanate component expressed by the following general formula (65). When terminal functional group is amino group and the other end is carboxyl group, the elastomer may contain a small portion in which the two components are connected with each other by the isocyanate component expressed by the general formula (66).

When the two terminal functional group for the polyamide component (P) and the polymeric component (T) both comprise carboxyl group, the elastomer may contain a small portion in which the two components are connected with each other by the isocyanate component expressed by the following general formula (67). When one molecular end is carboxyl group and the other end is hydroxyl group, the elastomer may contain a small portion in which the two components are connected with the isocyanate component expressed by the general formula (68),

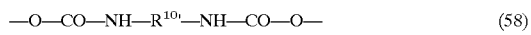   (58)

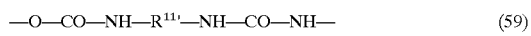   (59)

   (64)

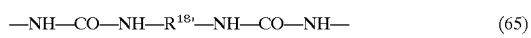   (65)

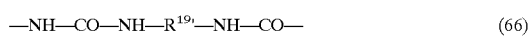   (66)

   (67)

   (68)

In these formula (58), (59), (64), (65), (66), (67) and (68) $R^{10'}, R^{11'}, R^{17'}, R^{18'}, R^{19'}, R^{20'}$, and $R^{21'}$ denote an alkylene group of 2 to 15 carbons, $—C_6H_4—$ (phenylene group), $—C_6H_4—CH_2—$, or $—C_6H_4—CH_2—C_6H_4—$) group.

$R^{10'}, R^{11'}, R^{17'}, R^{18'}, R^{19'}, R^{20'}$, and $R^{21'}$ may be a composite functional group of the above groups.

Examples of the above diisocyanate compounds (Q') are similar to the diisocyanate compound (U') in the present part I of the present invention.

The amide elastomer according to the part III of the present invention comprises 50 to 2,000 parts by weight of the polymeric component (T), and 10 to 100 parts by weight of the isocyanate component (Q) relative to 100 parts by weight of the polyamide component (P).

With the polymeric component (T) less than 50 parts by weight, the obtained amide elastomer loses sufficient elasticity. With the polymeric component (T) exceeding 2,000 parts by weight, the obtained amide elastomer loses sufficient mechanical strength. The content is preferably in the range from 200 to 1,000 parts by weight.

With the isocyanate component (Q) less than 10 parts by weight, the obtained amide elastomer does not reach the sufficient molecular weight, leading to inferior mechanical strength. With the isocyanate component (Q) exceeding 100 parts by weight, the obtained amide elastomer loses sufficient elasticity. The content is preferably in the range from 30 to 70 parts by weight.

In the production method of amide elastomer according to the part III of the present invention, the production method of the amide elastomer is characterized by comprising the following two processes. ① Production of prepolymer by the reacting the polymeric component (T) possessing hydroxyl group at the two molecular terminals with the diisocyanate compound (Q'), and ② The process of reacting the above prepolymer with the polyamide component (P).

The advantages of the part III invention are found in the following two points.

(1) Usually diffent polymeric components are not mutually compatible, and difficult to react with each other. When the polymeric component (T) and the polyamide component (P) used in the part III of the present invention are reacted simultaneously with the diisocyanate compound (Q'), usually the simultaneous reaction of the three components yields a blended mixture of two polymeric species, inhibiting the production of block copolymer. Instead, the polymer growth proceeds for the two components such as the polymeric components (T) with the diisocyanate compound (Q'), or the polyamide components (P) with the diisocyanate compound (Q'). According to the part III of the present invention, however, the terminal isocyanate group in the prepolymer comprising the polymeric component (T) is reacted securely with the polyamide component (P), yielding the block copolymer. In order to enhance the reactivity in this case, the reaction apparatus and the reaction temperature are the critical factors.

(2) In the second process, an excess molar amount of the polyamide component (P) is reacted with the prepolymer. This works to yield block copolymers, of which the molecular terminals are sealed with the hard segment, that is, the polyamide component.

The physical property of the product thus obtained as an elastomer varies to a large extent depending on the terminal kinds of the block copolymer. When the terminal is the soft segment of the polymeric component (T), this segment does not contribute to the expression of rubber elasticity, but lowers the melting point of the crystalline hard segment, inducing inferior creep resistance and mechanical strength at high temperatures. When the terminal is the hard segment, on the other hand, it is expected to improve the creep resistance and mechanical strength at high temperatures. The production method of the thermoplastic elastomer according to the part III of the present invention is suited for obtaining block copolymers, of which the molecular terminal is sealed with the hard segment that is expected to improve the creep resistance and mechanical strength at high temperatures.

The illustrative embodiments of the production method according to the part III of the present invention are described hereinafter in detail.

In the above first process, it is preferable to react the polymeric component (T) with an excess amount of the diisocyanate compound (Q'). The molar amount of the diisocyanate compound (Q') to the polymeric component (T) is most preferably in the range from 1.1 to 2.2 times. With the ratio below 1.1 times, the two molecular terminals of the obtained prepolymer are not completely converted to isocyanate group, which may inhibit the reaction in the second process. With the ratio exceeding 2.2 times, a part of the diisocyanate compound (Q') is left unreacted after the reaction, which may cause side reactions in the second process. The molar ratio is more preferably in the range from 1.2 to 2.0 times.

The reaction temperature in the above first process is preferably in the range from 100 to 240° C. With the temperature below 100° C., the reaction may not proceed sufficiently. With the temperature exceeding 240° C., the polymeric component (T) starts to decompose. The reaction temperature is more preferably in the range from 120 to 160° C.

In the above second process, the obtained prepolymer is reacted with the polyamide component (P) having a molar ratio of 0.9 to 3.0 times. In order to obtain block copolymers, of which the molecular terminals are sealed with the hard segment, that is the polyamide component, the prepolymer may be reacted preferably with an excess molar amount of the polyamide component (P). The molar ratio of the polyamide component (P) to the prepolymer is preferably in the range from 1.2 to 3.0 times. When the molar ratio is below less than 1.2 times, the reaction may partly yield block copolymers having the soft segment in the molecular terminal. With the molar ratio exceeding 3.0 times, the elasticity of the obtained amide elastomer becomes inferior. The molar ratio is more preferably in the range from 1.25 to 2.0 times.

It is possible to control the structure of the obtained block copolymers by changing the composition ratio of the polyamide component (P) and the polymeric component (T). If the hard segment is referred to as A and the soft segment is referred to as B, block copolymers of ABA type are obtained when the molar ratio of the polyamide component (P) to the prepolymer is 2.0 times. When the ratio is 1.5 times, block copolymers of ABABA type are obtained. And when the ratio is 1.25 times, block copolymers of ABABABABA type are obtained.

The amide elastomer having significantly improved creep resistance and mechanical strength at high temperatures may be prepared by reacting a block copolymer, of which molecular terminals are sealed with the hard segment of the polyamide component, with the diisocyanate compound (Q') followed by further molecular weight treatment.

If the molecular terminal of the hard segment is not the requisite, it is preferable, for obtaining the amide elastomer of high molecular weight, to react the prepolymer with the polyamide component (P) in a molar ratio of 0.9 to 1.2 times. When the molar ratio is below 0.9 time or exceeds 1.2 times, it becomes difficult to increase the molecular weight.

In the case wherein the two molecular terminals of the prepolymer employed in the second process are not completely converted to isocyanate group, the amide elastomer with high molecular weight may be obtained by the following method. The polyamide component (P) is first reacted with an excess molar amount of diisocyanate compound (Q') yielding another polyamide compound (P) having isocyanate group at the two molecular terminals. Then this product is further reacted with the above prepolymer yielding the amide elastomer of high molecular weight. In the above series of reactions, the molar amount of diisocyanate compound (Q') is preferably in the range from 0.9 to 1.2 times to the sum of the polymeric component (T) and the polyamide component (P). When the molar ratio is below 0.9 time or exceeds 1.2 times, it becomes difficult to increase the molecular weight.

In the above second process, the reaction temperature is preferably in the range from 180 to 280° C. With the temperature below 180° C., the polyamide component does not completely meet. As a result, the reaction does not proceed smoothly, leading to lowered molecular weight for the obtained product. With the temperature exceeding 280° C., the prepolymer and the diisocyanate compound (Q') starts to decompose, thus it is difficult to obtain polymers of insufficient mechanical strength. The reaction temperature is more preferably in the range from 200 to 260° C.

It is possible to employ catalysts for the above reaction in the production method according to the part III of the present invention. Examples of the above catalysts are similar to the catalysts described in the part I of the present invention.

The above reaction is preferably carried out in bulk. With this reaction method, the reactivity of the second process is improved significantly. With regard to the reaction apparatus, an extruder may be employed.

As the above extruder, a bi-axial extruder wherein two axes rotate in the same direction is preferably used. By using this apparatus, the reactivity for the second process is particularly improved. A tandem extruder is preferably employed for carrying out for the first process and the second process continuously.

It is possible to use the aforementioned stabilizers in the production method according to the part III of the present invention. It is also possible to add above-mentioned stabilizers to the amide elastomer produced by the method according to the part III of the present invention.

The part IV of the present invention relates to an amide elastomer produced by the production method of amide elastomer according to the part III of the present invention. The amide elastomer according to the part IV of the present invention is produced by the production method of amide elastomer according to the part III of the present invention. It exhibits high block property for the hard segment component and the soft segment component as well as the excellent elasticity and the mechanical characteristics at high temperatures, especially the settling resistance at high temperatures.

During or after the production, it is also possible to add additives to the amide elastomer according to the part IV of the present invention as long as the practical quality of the elastomer is not impaired. Examples of the additives include fibers, inorganic fillers, flame-retardants, UV light absorbers, anti-static agents, inorganic substances, and salts of higher fatty acids. They may be used singly or in mixed form of more than two kinds.

The properties of the amide elastomer according to the part IV of the present invention may be modified by blending other thermoplastic resins, or rubber components.

The amide elastomer according to the part IV of the present invention may be shaped to molded products using methods such as press molding, extrusion molding, injection molding, or blow molding. The molding temperature varies depending on the melting point of the employed elastomer and the molding method, but is preferably in the range from 160 to 280° C. With the molding temperature below 160° C., the flowability of the amide elastomers becomes low, leading to the non-homogeneous molded products. With the molding temperature exceeding 280° C., the obtained elastomer starts to decompose, yielding products with insufficient mechanical strength.

The amide elastomer according to the part IV of the present invention may be preferably employed for molded parts of automobile, electric and electronic parts, industrial parts, sport goods, and medical goods.

In addition, the thermoplastic elastomer according to the part IV of the present invention may be favorably employed for elastomer fibers, elastomer sheets, composite sheets, films, composite films, foams, hot-melt adhesives, binders, and polymer-alloys together with other resins.

The amide elastomer according to the part IV of the present invention has excellent elasticity and physical properties at high temperatures due to the following reasons.

Usually different polymeric components are not mutually compatible, and difficult to react with each other. When the polymeric component (T) belonging to the soft segment component and the polyamide component (P) belonging to the hard segment component are bonded with each other by controlling the reaction with the diisocyanate compound (Q'). As the result, an amide elastomer is obtained possessing especially high block property for the hard segment and the soft segment.

The amide elastomer exhibits its character as an elastomer due to the cross-linking points formed by the polyamide component. As the amide elastomer according to the part IV of the present invention comprises the polyamide rich section and the soft segment rich section, the polyamide section goes to crystallize more readily than ordinary amide elastomers having a similar elasticity. As a result, rigid cress-linking points are formed, yielding elastomer materials having superior mechanical characteristics at high temperatures. The presence of soft segment rich section increases the molecular weight between cross-linking points, which leads to elastomer materials with superior elasticity.

While the illustrative embodiments of the present invention have been described hereinafter in detail, it is not intended that the scope of the present invention is limited to the examples and descriptions. Measurements for various physical characteristics were carried out by employing the following methods.

Number-average molecular weight: Gel permeation chromatography (HLC 8020 series, produced by TOSOH)
　Column: Shodex HFIP 806M (in duplicate)
　Solvent: hexafluoro-isopropanol (with 0.005N sodium trifluoroacetate)
　Standard: polymethyl methacrylate Acid value for polyester: A sample is dissolved in a mixed solvent of benzyl alcohol/chloroform followed by the neutralization titration using phenol red as the indicator.

Hydroxyl value for polyester: a sample and succinic anhydride are dissolved in a mixed solvent of nitrobenzene/pyridine for 10 hours. Methanol is added to the reaction mixture for precipitation. The obtained reaction product is treated for the above acid value measurement to yield the hydroxyl value.

The certified values of the manufacturer are adopted for the acid value and hydroxyl value for the polyether, and isocyanate value (NCO value) for the isocyanate compound.

Glass transition temperature: Measured with a viscoelasticity spectrometer (RSA-II, produced by Rheometric Scientific F.E.) with the raising rate of temperature at 3° C./min, frequency at 1.61 Hz, strain at 0.05%, sample: rectangle (size of 0.5 mm thick and 3 mm width).

Melting point: measured by differential scanning calorimeter (DSC) with the raising rate of temperature at 10° C./min.

Surface rigidity: measured with the A-type spring at 23° C., according to JIS K6301.

Tensile characteristics: measured the tensile strength and the strain at room temperature according to JIS K6301.

Permanent compression strain: measured compression strain at 100° C. with 25% according to JIS K6301.

Moisture permeability: measured film with a 100 micron thick according to JIS Z0208 and ASTM F372-73.

Light resistance: A sheet with 1 mm thick is exposed to light in carbon arc type Fade tester with black panel temperature of 63° C. for 80 hours. The yellowness, i.e. yellowing value was measured (according to JIS K7105) by color-difference meter (Color Analyzer, TC-1800 MK-II, produced by Tokyo Denshoku CO.) together with the surface rigidity, and calculated from the difference between before and after the exposure. Solubility was measured by the following method.

An elastomer sample of 15 g was mixed with 85 g of N,N-dimethyl formamide (DMF) and stirred at 120° C. for 1 hour.
　○: soluble
　Δ: soluble with difficulty
　X: hardly soluble The stability of the solution was measured by the following method.

The above solution for the solubility measurement was kept at 80° C. for 1 hour for the judgement of stability.
　○: stable
　Δ: coagulates as sol
　X: quick formation of insoluble precipitates

PREFERRED EMBODIMENTS OF THE INVENTION

REFERENCE EXAMPLE 1

Synthesis of Polyester (b-1)

A reaction system comprising 100 parts (wt) of dimethyl terephthalate, 102 parts of 1,4-butane diol, 0.3 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 200° C. for 3 hours under a nitrogen atmosphere for the ester-exchange reaction. The proceeding extent of the reaction was confirmed by measuring the amount of refluxing methanol.

After the completion of the ester-exchange reaction, the reaction mixture was heated further to 240° C. in 20 minutes and reuced pressure. The polymerization system reached less than 2 Torr in 15 minutes after a start of reducing pressure. It was kept for more 10 minutes for the polycondensation reaction, yielding finally 113 parts (wt) of polyester of white color. This polyester (b-1) was analyzed to have the number-average molecular weight of 2,000, the acid value and the hydroxyl value of 5.0 (micro-eq/g) and 1,000 (micro-eq/g) respectively.

REFERENCE EXAMPLE 2

Synthesis of Polyester (b-2)

A reaction system comprising 100 parts (wt) of dimethyl terephthalate, 102 parts of 1,4-butane diol, 48 parts of polytetramethylene glycol (produced by BASF, PTHF1000, number-average molecular weight in about 1,000), 0.3 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 200° C. for 3 hours under a nitrogen atmosphere for the ester-exchange reaction. The proceeding extent of the reaction was confirmed by measuring the amount of refluxing methanol.

After the completion of the ester-exchange reaction, the reaction mixture was heated further to 240° C. in 20 minutes and reduced pressure. The polymerization system reached less than 2 Torr in 15 minutes after a start of reducing pressure. It was kept for more 30 minutes for the polycondensation reaction, yielding finally 160 parts (wt) of polyester of white color. This polyester (b-2) was analyzed to have the number-average molecular weight of 5,000, the acid value and the hydroxyl value of 5.0 (micro-eq/g) and 400 (micro-eq/g) respectively.

REFERENCE EXAMPLE 3

Synthesis of Polyester (b-3)

A reaction system comprising 100 parts (wt) of dimethyl terephthalate, 38 parts of dimethyl adipate, 102 parts of 1,4-butane diol, 0.3 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 200° C. for 3 hours under a nitrogen atmosphere for the ester-exchange reaction. The proceeding extent of the reaction was confirmed by measuring the amount of refluxing methanol.

After the completion of the ester-exchange reaction, the reaction mixture was heated further to 240° C. in 20 minutes and reduced pressure. The polymerization system reached less than 2 Torr in 15 minutes after a start of reducing pressure. It was kept for more 10 minutes for the polycondensation reaction, yielding finally 128 parts (wt) of polyester of white color. This polyester (b-3) was analyzed to have the number-average molecular weight of 2,200, the acid value and the hydroxyl value of 6.0 (micro-eq/g) and 900 (micro-eq/g) respectively.

REFERENCE EXAMPLE 4

Synthesis of Polyester (b-4)

A reaction system comprising 100 parts (wt) of dimethyl terephthalate, 83 parts of 1,4-butane diol, 30 parts of cyclohexane dimethanol, 0.3 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 200° C. for 3 hours under a nitrogen atmosphere for the ester-exchange reaction. The proceeding extent of the reaction was confirmed by measuring the amount of refluxing methanol.

After the completion of the ester-exchange reaction, the reaction mixture was heated further to 240° C. in 20 minutes and reduced pressure. The polymerization system reached less than 2 Torr in 15 minutes after a start of reducing pressure. It was kept for more 5 minutes for the polycondensation reaction, yielding finally 136 parts (wt) of polyester of white color. This polyester (b-4) was analyzed to have the number-average molecular weight of 1,000, the acid value and the hydroxyl value of 4.0 (micro-eq/g) and 1,900 (micro-eq/g) respectively.

REFERENCE EXAMPLE 5

Synthesis of Polyester (b-5)

A reaction system comprising 100 parts (wt) of dimethyl terephthalate, 43 parts of dimethyl isophthalate, 156 parts of 1,4-butane diol, 0.3 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 200° C. for 3 hours under a nitrogen atmosphere for the ester-exchange reaction. The proceeding extent of the reaction was confirmed by measuring the amount of refluxing methanol.

After the completion of the ester-exchange reaction, the reaction mixture was heated further to 240° C. in 20 minutes and reduced pressure. The polymerization system reached less than 2 Torr in 15 minutes after a start of reducing pressure. It was kept for more 15 minutes for the polycondensation reaction, yielding finally 120 parts (wt) of polyester of white color. This polyester (b-5) was analyzed to have the number-average molecular weight of 3,200, the acid value and the hydroxyl value of 7.0 (micro-eq/g) and 625 (micro-eq/g) respectively.

REFERENCE EXAMPLE 6

Synthesis of Polyester (b-6)

A reaction system comprising 100 parts (wt) of dimethyl terephthalate, 11 parts of dimethyl isophthalate, 103 parts of 1,4-butane diol, 17 parts of cyclohexane dimethanol, 0.3 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 200° C. for 3 hours under a nitrogen atmosphere for the ester-exchange reaction. The proceeding extent of the reaction was confirmed by measuring the amount of refluxing methanol.

After the completion of the ester-exchange reaction, the reaction mixture was heated further to 240° C. in 20 minutes and reduced pressure. The polymerization system reached less than 2 Torr in 15 minutes after a start of reducing pressure. It was kept for more 10 minutes for the polycondensation reaction, yielding finally 120 parts (wt) of polyester of white color. This polyester (b-6) was analyzed to have the number-average molecular weight of 2,600, the acid value and the hydroxyl value of 7.0 (micro-eq/g) and 770 (micro-eq/g) respectively.

EXAMPLE 1

An elastomer composition comprising 300 parts (wt) of polyethylene glycol, which corresponds to the polyether compound (a) having the number-average molecular weight of 1,000, the acid value and the hydroxyl value of 0 (micro-eq/g) and 2,000 (micro-eq/g) respectively, 87.5 parts of 4,4'-diphenylmethane diisocyanate, which corresponds to the poly-isocyanate compound (c) having the NCO value of 8,000 (micro-eq/g), was led into a bi-axial extruder (produced by Toshiba Machinery, L/D=58) through its first barrel, supplying at the same time 100 parts of the polyester (b-1) mentioned hereinabove through the fifth barrel of the same extruder using the compulsory side feeder, and was molten and mixed together at 200° C. The product in pellet form was the thermoplastic elastomer of the present invention comprising the polyether component in 62 weight % having the carbon/oxygen atomic ratio of 2.0, and having the glass transition temperature of −30° C.

Meanwhile the NCO value means the number of NCO molecular terminals per 1 g elastomer, and is defined by the unit of 1/MX, where MX is the number of isocyanate radicals.

The obtained elastomer pellets were molded into 2 mm thick sheets and 100 micrometer thick sheets through the press molding (at 220° C.), and measured of various properties. The solubility measurements were carried out using the pellets in situ. The results are summarized in Table 1.

EXAMPLE 2

The pellets of the thermoplastic elastomer were prepared as in Example 1 except that 286 parts by weight of polyethylene glycol and 83 parts by weight of 4,4'-diphenylmethane diisocyanate were employed. The obtained pellets were formed into 2 mm thick sheets and 100 micrometer thick sheets with the press molding machine(at 230° C.), and various physical properties of the sheets were measured. A measurement of solubility was carried out using the pellets themselves. The results are summarized in Table 1.

EXAMPLE 3

The pellets of the thermoplastic elastomer were prepared as in Example 1 except that 240 parts by weight of polyethylene glycol having the number-average molecular weight of 1,000, the hydroxyl value of 2,000 (micro-eq/g), and the acid value of 0 (micro-eq/g) was employed as the polyether compound (a) together with 60 parts by weight of polytetrametylene glycol having the number-average molecular weight of 1,000, the hydroxyl value of 2,000 (micro-eq/g), and the acid value of 0 (micro-eq/g). The obtained pellets were formed into 2 mm thick sheets and 100 micrometer thick sheets with the press molding machine (at 230° C.) and various physical properties of the sheets were measured. A measurement of solubility was carried out using the pellets themselves. The results are summarized in Table 1.

EXAMPLE 4

The pellets of the thermoplastic elastomer were prepared as in Example 1 except that 210 parts (wt) of polyethylene glycol having the number-average molecular weight of 1,000, the hydroxyl value of 2,000 (micro-eq/g), and the acid value of 0 (micro-eq/g) were employed as the polyether compound (a) together with 90 parts of a polyether, which was prepared by the equi-molar copolymerization of ethylene oxide and tetrahydrofuran, having the number-average molecular weight of 1,000, the hydroxyl value of 2,000 (micro-eq/g), and the acid value of 0 (micro-eq/g). The obtained pellets were formed into 2 mm thick sheets and 100 micrometer thick sheets with the press molding machine (at 230° C.), and various physical properties of the sheets were measured. A measurement of solubility was carried out using the pellets themselves. The results are summarized in Table 1.

EXAMPLE 5

The pellets of the thermoplastic elastomer were prepared as in Example 1 except that 450 parts by weight of polyethylene glycol having the number-average molecular weight of 1,500, the hydroxyl value of 1,300 (micro-eq/g), and the acid value of 0 (micro-eq/g) was employed as the polyether compound (a) together with 87.5 parts by weight of 4,4'-diphenylmethane diisocyanate. The obtained pellets were formed into 2 mm thick sheets and 100 micrometer thick sheets with the press molding amchine (at 220° C.), and various physical properties of the sheets were measured. A measurement of solubility was carried out using the pellets themselves. The results are summarized in Table 1.

EXAMPLE 6

An elastomer composition comprising 160 parts (wt) of polyethylene glycol, which corresponds to the polyether compound (a) having the number-average molecular weight of 1,000, the acid value and the hydroxyl value of 0 (micro-eq/g) and 2,000 (micro-eq/g) respectively, 45 parts of 4,4'-diphenylmethane diisocyanate, which corresponds to the poly-isocyanate compound (c) having the NCO value of 8,000 (micro-eq/g), was led into a bi-axial extruder (produced by Toshiba Machinery, L/D=58) through its first barrel, supplying at the same time 100 parts of the polyester (b-2) mentioned hereinabove through the fifth barrel of the same extruder using the compulsory side, and was molten and mixed together at 200° C. The product in pellet form was the thermoplastic elastomer of the present invention.

The obtained elastomer pellets were formed into 2 mm thick sheets and 100 micrometer thick sheets with the press molding machine(at 220° C.), and various properties of the sheets were measured. A measurement of solubility was carried out using the pellets themselves. The results are summarized in Table 1.

EXAMPLE 7

A reaction system comprising 100 parts (wt) of dimethyl terephthalate, 102 parts of 1,4-butane diol, 170 parts of polyethylene glycol having the number-average molecular weight of 1,000, 0.3 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butylphenyl)-phosphite as stabilizers was heated at 200° C. for 3 hours under a nitrogen atmosphere for the ester-exchange reaction. The proceeding extent of the reaction was confirmed by measuring the amount of refluxing methanol.

After the completion of the ester-exchange reaction, the reaction mixture was heated further to 240° C. in 20 minutes and reduced pressure. The polymerization system reached less than 2 Torr in 20 minutes after a start of reducing pressure. It was kept for more 6 minutes for the polycondensation reaction, yielding finally 283 parts (wt) of the thermoplastic elastomer of the present invention.

The obtained elastomer was formed into 2 mm thick sheets and 100 micrometer thick sheets with the press molding machine (at 230° C.), and various properties of the sheets were measured. A measurement of solubility was carried out using the pellets themselves. The results are summarized in Table 1.

EXAMPLE 8

An elastomer composition comprising 273 parts (wt) of polyethylene glycol, which corresponds to the polyether compound (a) having the number-average molecular weight of 1,000, the acid value and the hydroxyl value of 0 (micro-eq/g) and 2,000 (micro-eq/g) respectively, 79.5 parts of 4,4'-diphenylmethane diisocyanate, which corresponds to the poly-isocyanate compound (c) having the NCO value of 8,000 (micro-eq/g), was led into a bi-axial extruder (produced by Toshiba Machinery, L/D=58) through its first barrel, supplying at the same time 100 parts of the polyester (b-3) mentioned hereinabove through the fifth barrel of the same extruder using the compulsory side feeder, and was molten and mixed together at 200° C. The product in pellet form was the thermoplastic elastomer of the present invention.

The obtained elastomer pellets were formed into 2 mm thick sheets and 100 micrometer thick sheets with the press molding machine(at 220° C.), and various physical properties of the sheets were measured. A measurement of solubility was carried out using the pellets themselves. The results are summarized in Table 1.

EXAMPLE 9

An elastomer composition comprising 600 parts (wt) of polyethylene glycol, which corresponds to the polyether compound (a) having the number-average molecular weight of 1,000, the acid value and the hydroxyl value of 0 (micro-eq/g) and 2,000 (micro-eq/g) respectively, 175 parts of 4,4'-diphenylmethane diisocyanate, which corresponds to the poly-isocyanate compound (c) having the NCO value of 8,000 (micro-eq/g), was led into a bi-axial extruder (produced by Toshiba Machinery, L/D=58) through its first barrel, supplying at the same time 100 parts of the polyester (b-4) mentioned hereinabove through the fifth barrel of the same extruder using the compulsory side feeder, and was molten and mixed together at 200° C. The product in pellet form was the thermoplastic elastomer of the present invention.

The obtained elastomer pellets were molded into 2 mm thick sheets and 100 micrometer thick sheets with the press molding machine(at 220° C.), and various physical properties of the sheets were measured. A measurement of solubility was carried out using the pellets themselves. The results are summarized in Table 1.

EXAMPLE 10

An elastomer composition comprising 156 parts (wt) of polyethylene glycol, which corresponds to the polyether compound (a) having the number-average molecular weight of 1,000, the acid value and the hydroxyl value of 0 (micro-eq/g) and 2,000 (micro-eq/g) respectively, 47 parts of 4,4'-diphenylmethane diisocyanate, which corresponds to the poly-isocyanate compound (c) having the NCO value of 8,000 (micro-eq/g), was led into a bi-axial extruder (produced by Toshiba Machinery, L/D=58) through its first barrel, supplying at the same time 100 parts of the polyester (b-5) mentioned hereinabove through the fifth barrel of the same extruder using the compulsory side feeder, and was molten and mixed together at 200° C. The product in pellet form was the thermoplastic elastomer of the present invention.

The obtained elastomer pellets were formed into 2 mm thick sheets and 100 micrometer thick sheets with the press molding machine (at 220° C.), and various physical properties of the sheets were measured. A measurement of solubility was carried out using the pellets themselves. The results are summarized in Table 1.

EXAMPLE 11

An elastomer composition comprising 231 parts (wt) of polyethylene glycol, which corresponds to the polyether compound (a) having the number-average molecular weight of 1,000, the acid value and the hydroxyl value of 0 (micro-eq/g) and 2,000 (micro-eq/g) respectively, 67 parts of 4,4'-diphenylmethane diisocyanate, which corresponds to the poly-isocyanate compound (c) having the NCO value of 8,000 (micro-eq/g), was led into a bi-axial extruder (produced by Toshiba Machinery, L/D=58) through its first barrel, supplying at the same time 100 parts of the polyester (b-6) mentioned hereinabove through the fifth barrel of the same extruder using the compulsory side feeder, and was molten and mixed together at 200° C. The product in pellet form was the thermoplastic elastomer of the present invention.

The obtained elastomer pellets were formed into 2 mm thick sheets and 100 micrometer thick sheets with the press molding machine(at 220° C.), and various properties of the sheets were measured. A measurement of solubility was carried out using the pellets themselves. The results are summarized in Table 1.

COMPARATIVE EXAMPLE 1

The pellets of the thermoplastic elastomer were prepared as in Example 1 except that 50 parts by weight of polyethylene glycol was employed and 25 parts by weight of 4,4'-diphenylmethane diisocyanate were employed. The obtained pellets were formed into 2 mm thick sheets and 100 micrometer thick sheets with the press molding machine(at 220° C.), and various physical properties of the sheets were measured. A measurement of solubility was carried out using the pellets themselves. The results are summarized in Table 1.

COMPARATIVE EXAMPLE 2

The pellets of the thermoplastic elastomer were prepared as in Example 1 except that 300 parts by weight of polytetramethylene glycol having the number-average molecular weight of 1,000, the acid value and the hydroxyl value of 0 (micro-eq/g) and 2,000 (micro-eq/g) respectively, was employed as the polyether compound (a). The obtained pellets were formed into 2 mm thick sheets and 100 micrometer thick sheets with the press molding machine (at 220° C.), and various physical properties of the sheets were measured. The results are summarized in Table 1.

COMPARATIVE EXAMPLE 3

The pellets of the thermoplastic elastomer were prepared as in Example 1 except that 360 parts by weight of polyethylene glycol having the number-average molecular weight of 600, the hydroxyl value of 3,300 (micro-eq/g), and the acid value of 0 (micro-eq/g) was employed as the polyether compound (a) together with 162.5 parts by weight of 4,4'-diphenylmethane diisocyanate having the NCO value of 8,000 (micro-eq/g). The obtained pellets were formed into 2 mm thick sheets and 100 micrometer thick sheets with the press molding machine (at 220° C.), and various physical properties of the sheets were measured. The results are summarized in Table 1.

COMPARATIVE EXAMPLE 4

The pellets of the thermoplastic elastomer were prepared as Example 1 except that 180 parts by weight of polyethylene glycol having the number-average molecular weight of 1,000, the hydroxyl value of 2,000 (micro-eq/g), and the acid value of 0 (micro-eq/g) was employed as the polyether compound (a) together with 120 parts by weight of polytetramethylene glycol having the number-average molecular weight of 1,000, the hydroxyl value of 2,000 (micro-eq/g), and the acid value of 0 (micro-eq/g). The obtained pellets were formed into 2 mm thick sheets and 100 micrometer thick sheets with the press molding machine (at 230° C.), and various physical properties of the sheet were mearured. The results are summarized in Table 1.

COMPARATIVE EXAMPLE 5

The pellets of the thermoplastic elastomer were prepared as in Example 1 except that all of the polyether compound (a), the polyester compound (b), and the poly-isocyanate compound (c) were blended simultaneously and led through the first barrel, but only as clay-like product was obtained without the thermoplastic elastomer of the present invention obtained.

TABLE 1

|  | Example | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| Thermoplastic elastomer | | | | | | | | | | | |
| Content of polyether component (wt %) | 62 | 61 | 62 | 62 | 70 | 52 | 60 | 60 | 69 | 51 | 58 |
| C/O ratio for polyether component | 2 | 2 | 2.4 | 2.3 | 2 | 2 | 2 | 2 | 2 | 2 | 2 |
| Glass transition temperature (° C.) | −30 | −30 | −40 | −45 | −45 | −25 | −42 | −30 | −30 | −30 | −30 |
| Physical property of Thermoplastic elastomer | | | | | | | | | | | |
| Melting point (° C.) | 185 | 190 | 185 | 185 | 175 | 185 | 155 | 158 | 148 | 155 | 160 |
| Surface rigidity (JIS A) | 75 | 77 | 75 | 75 | 70 | 90 | 91 | 75 | 68 | 77 | 72 |
| Tensile strength (kgf/cm2) | 200 | 170 | 220 | 200 | 160 | 280 | 100 | 170 | 150 | 180 | 160 |
| Elongation (%) | 1200 | 1000 | 1300 | 1100 | 1400 | 900 | 650 | 1200 | 2000 | 1500 | 1600 |
| Permanent strain of Compression (100° C., %) | 55 | 47 | 55 | 56 | 57 | 51 | 98 | 73 | 79 | 68 | 73 |
| Moisture permeability (g/cm2/24 hr) (ASTM F372-73) | 9000 | 8500 | 7000 | 6800 | 10000 | 6000 | 10200 | 8200 | 8000 | 7800 | 8600 |
| Moisture permeability (g/cm2/24 hr) (JIS Z0208) | 3700 | 3600 | 3400 | 3400 | 3800 | 3300 | 3800 | 3600 | 3600 | 3500 | 3600 |
| Solubility | x | x | x | x | Δ | x | Δ | ○ | ○ | ○ | ○ |
| Stability | x | x | x | x | Δ | x | Δ | ○ | ○ | ○ | ○ |

|  | Comparative example | | | | |
| --- | --- | --- | --- | --- | --- |
|  | 1 | 2 | 3 | 4 | 5 |
| Thermoplastic elastomer | | | | | |
| Content of polyether component (wt %) | 29 | 62 | 58 | 62 | 62 |
| C/O ratio for polyether component | 2 | 4 | 2 | 2.8 | 2 |
| Glass transition temperature (° C.) | −20 | −50 | −10 | −47 | — |
| Physical property of Thermoplastic elastomer | | | | | |
| Melting point (° C.) | 200 | 185 | 180 | 185 | Clay-like prodt. |
| Surface rigidity (JIS A) | 98 | 75 | 80 | 75 | |
| Tensile strength (kgf/cm2) | 350 | 220 | 350 | 230 | |
| Elongation (%) | 600 | 1400 | 700 | 1350 | |
| Permanent strain of Compression (100° C., %) | 50 | 54 | 55 | 55 | |
| Moisture permeability (g/cm2/24 hr) (ASTM F372-73) | 2000 | 1000 | 2500 | 3500 | |
| Moisture permeability (g/cm2/24 hr) (JIS Z0208) | 1100 | 600 | 1400 | 1800 | |
| Solubility | x | x | x | x | |
| Stability | x | x | x | x | |

EXAMPLE 12

An elastomer composition comprising 300 parts (wt) of polyethylene glycol, which corresponds to the polyether compound (a) having the number-average molecular weight of 1,000, the acid value and the hydroxyl value of 0 (micro-eq/g) and 2,000 (micro-eq/g) respectively, 62.3 parts of hexamethylene diisocyanate, which corresponds to the poly-isocyanate compound (c) having the NCO value of 11,900 (micro-eq/g), was led into a bi-axial extruder (produced by Toshiba Machinery, L/D=58) through its first barrel, supplying at the same time 100 parts of the polyester (b-1) mentioned hereinabove through the fifth barrel of the same extruder using the compulsory side feeder, and was molten and mixed together at 200° C. The product in pellet form was the thermoplastic elastomer of the present invention.

The obtained elastomer pellets were formed into 1.2 mm thick sheets and 100 micrometer thick sheets with the press molding machine(at 220° C.), and various physical properties of the sheets were measured. A measurement of solubility was carried out using the pellets themselves. The results are summarized in Table 2.

EXAMPLE 13

The pellets of the thermoplastic elastomer were prepared as in Example 12 except that 286 parts by weight of polyethylene glycol was employed together with 59 parts of hexamethylene diisocyanate and 0.3 parts of tin octanoate. The obtained pellets were formed into 1.2 mm thick sheets and 100 micrometer thick sheets with the press molding machine (at 230° C.), and various physical properties of the sheets were measured. A measurement of solubility was carried out using the pellets themselves. The results are summarized in Table 2.

EXAMPLE 14

The pellets of the thermoplastic elastomer were prepared as in Example 12 except that 240 parts by weight of polyethylene glycol having the number-average molecular weight of 1,000, the hydroxyl value of 2,000 (micro-eq/g), and the acid value of 0 (micro-eq/g) was employed as the polyether compound (a) together with 60 parts by weight of polytetramethylene glycol having the number-average molecular weight of 1,000, the hydroxyl value of 2,000 (micro-eq/g), and the acid value of 0 (micro-eq/g). The obtained pellets were formed into 1.2 mm thick sheets and 100 micrometer thick sheets with the press molding machine (at 230° C.), and various physical properties of the sheets were measured. A measurement of solubility was carried out using the pellets themselves. The results are summarized in Table 2.

EXAMPLE 15

The pellets of the thermoplastic elastomer were prepared as in Example 12 except that 210 parts by weight of polyethylene glycol having the number-average molecular weight of 1,000, the hydroxyl value of 2,000 (micro-eq/g), and the acid value of 0 (micro-eq/g) was employed as the polyether compound (a) together with 90 parts of a polyether, which was prepared by the equi molar copolymerization of ethylene oxide and tetrahydrofuran, having the number-average molecular weight of 1,000, the hydroxyl value of 2,000 (micro-eq/g), and the acid value of 0 (micro-eq/g) in 60 parts by weight. The obtained pellets were formed into 2 mm thick sheets and 100 micrometer thick sheets with the press molding machine(at 230° C.), and various physical properties of the sheets were measured. A measurement of solubility was carried out using the pellets themselves. The results are summarized in Table 2.

EXAMPLE 16

The pellets of the thermoplastic elastomer were prepared as in Example 12 except that 450 parts by weight of polyethylene glycol having the number-average molecular weight of 1,500, the hydroxyl value of 1,300 (micro-eq/g), and the acid value of 0 (micro-eq/g) was employed as the polyether compound (a) together with 62.3 parts by weight of hexamethylene diisocyanate. The obtained pellets were formed into 1.2 mm thick sheets and 100 micrometer thick sheets with the press molding machine (at 220° C.), and various physical properties of the sheets were measured. A measurement of solubility was carried out using the pellets themselves. The results are summarized in Table 2.

EXAMPLE 17

An elastomer composition comprising 160 parts of polyethylene glycol, which corresponds to the polyether compound (a) having the number-average molecular weight of 1,000, the acid value and the hydroxyl value of 0 (micro-eq/g) and 2,000 (micro-eq/g) respectively, 32 parts of hexamethylene diisocyanate, which corresponds to the poly-isocyanate compound (c) having the NCO value of 11,900 (micro-eq/g), was led into a bi-axial extruder (produced by Toshiba Machinery, L/D=58) through its first barrel, supplying at the same time 100 parts of the polyester (b-2) mentioned hereinabove through the fifth barrel of the same extruder using the compulsory side feeder, and molten and mixed together at 200° C. The product in pellet form was the thermoplastic elastomer of the present invention. The obtained elastomer pellets were formed into 1.2 mm thick sheets and 100 micrometer thick sheets through the press molding machine(at 220° C.), and various physical properties of the sheets were measured. A measurement of solubility was carried out using the pellets themselves. The results are summarized in Table 2.

EXAMPLE 18

A reaction system comprising 100 parts of dimethyl terephthalate, 102 parts of 1,4-butane diol, 170 parts of polyethylene glycol having the number-average molecular weight of 1,000, 0.3 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butylphenyl)-phosphite as stabilizers was heated at 200° C. for 3 hours under a nitrogen atmosphere for the ester-exchange reaction. The proceeding extent of the reaction was confirmed by measuring the amount of refluxing methanol.

After the completion of the ester-exchange reaction, the reaction mixture was heated further to 240° C. in 20 minutes and reduced pressure. The polymerization system reached less than 2 Torr in 20 minutes after a start of reducing pressure. It was kept for more 6 minutes for the polycondensation reaction, yielding finally 283 parts (wt) of the thermoplastic elastomer of the present invention.

The obtained elastomer was formed into 2 mm thick sheets and 100 micrometer thick sheets with the press molding machine (at 230° C.), and various physical properties of the sheets were measured. A measurement of solubility was carried out using the pellets themselves. The results are summarized in Table 2.

EXAMPLE 19

An elastomer composition comprising 273 parts of polyethylene glycol, which corresponds to the polyether compound (a) having the number-average molecular weight of 1,000, the acid value and the hydroxyl value of 0 (micro-eq/g) and 2,000 (micro-eq/g) respectively, 56.6 parts of hexamethylene diisocyanate, which corresponds to the polyisocyanate compound (c) having the NCO value of 11,900 (micro-eq/g), was led into a bi-axial extruder (produced by Toshiba Machinery, L/D=58) through its first barrel, supplying at the same time 100 parts of the polyester (b-3) mentioned hereinabove through the fifth barrel of the same extruder using the compulsory side feeder, and was molten and mixed together at 200° C. The product in pellet form was the thermoplastic elastomer of the present invention. The obtained elastomer pellets were formed into 1.2 mm thick sheets and 100 micrometer thick sheets with the press molding machine(at 220° C.), and various physical properties of the sheets were measured. A measurement of solubility was carried out using the pellets themselves. The results are summarized in Table 2.

EXAMPLE 20

An elastomer composition comprising 600 parts of polyethylene glycol, which corresponds to the polyether compound (a) having the number-average molecular weight of 1,000, the acid value and the hydroxyl value of 0 (micro-eq/g) and 2,000 (micro-eq/g) respectively, 124.6 parts of hexamethylene diisocyanate, which corresponds to the polyisocyanate compound (c) having the NCO value of 11,900 (micro-eq/g), was led into a bi-axial extruder (produced by Toshiba Machinery, L/D=58) through its first barrel, supplying at the same time 100 parts of the polyester (b-4) mentioned hereinabove through the fifth barrel of the same extruder using the compulsory side feeder, and was molten and mixed together at 200° C. The product in pellet form was the thermoplastic elastomer of the present invention.

The obtained elastomer pellets were formed into 1.2 mm thick sheets and 100 micrometer thick sheets with the press molding machine (at 220° C.), and various physical properties of the sheets were measured. A measurement of the solubility was carried out using the pellets themselves. The results are summarized in Table 2.

EXAMPLE 21

An elastomer composition comprising 156 parts of polyethylene glycol, which corresponds to the polyether compound (a) having the number-average molecular weight of 1,000, the acid value and the hydroxyl value of 0 (micro-eq/g) and 2,000 (micro-eq/g) respectively, 34 parts of hexamethylene diisocyanate, which corresponds to the polyisocyanate compound (c) having the NCO value of 11,900 (micro-eq/g), was led into a bi-axial extruder (produced by Toshiba Machinery, L/D=58) through its first barrel, supplying at the same time 100 parts of the above polyester (b-5) through the fifth barrel of the same extruder using the compulsory side feeder for the molten blending at 200° C., yielding finally pellets of the thermoplastic elastomer according to the present invention.

The obtained elastomer pellets were molded into 1.2 mm thick sheets and 100 micrometer thick sheets through the press molding (at 220° C.), and measured of various properties. The solubility measurements were carried out using the pellets in situ. The results are summarized in Table 2.

EXAMPLE 22

An elastomer composition comprising 231 parts of polyethylene glycol, which corresponds to the polyether compound (a) having the number-average molecular weight of 1,000, the acid value and the hydroxyl value of 0 (micro-eq/g) and 2,000 (micro-eq/g) respectively, 48 parts of hexamethylene diisocyanate, which corresponds to the polyisocyanate compound (c) having the NCO value of 11,900 (micro-eq/g), was led into a bi-axial extruder (produced by Toshiba Machinery, L/D=58) through its first barrel, supplying at the same time 100 parts of the polyester (b-6) mentioned hereinabove through the fifth barrel of the same extruder using the compulsory side feeder, and was molten and mixed together at 200° C. The product in pellet form was the thermoplastic elastomer of the present invention.

The obtained elastomer pellets were formed into 1.2 mm thick sheets and 100 micrometer thick sheets with the press molding machine (at 220° C.). The various physical properties of the sheet were mearured. A measurement of the solubility was carried out using the pellets themselves. The results are summarized in Table 2.

COMPARATIVE EXAMPLE 6

The example 12 was repeated except that polyethylene glycol was employed in 50 parts together with 25 parts of 4,4'-diphenylmethane diisocyanate, yielding finally pellets of the thermoplastic elastomer. The obtained pellets were formed into 1.2 mm thick sheets and 100 micrometer thick sheets with the press molding method (at 220° C.) for the measurements of various properties. The results are summarized in Table 2.

COMPARATIVE EXAMPLE 7

The pellets of the thermoplastic elastomer were prepared as in Example 12 except that 300 parts by weight of polytetramethylene glycol having the number-average molecular weight of 1,000, the acid value and the hydroxyl value of 0 (micro-eq/g) and 2,000 (micro-eq/g) respectively, was employed as the polyether compound (a) together with 87.5 parts of 4,4'-diphenylmethane diisocyanate. The obtained pellets were formed into 1.2 mm thick sheets and 100 micrometer thick sheets with the press molding machine (at 220° C.). The various physical properties of the sheet were mearured. The results are summarized in Table 2.

COMPARATIVE EXAMPLE 8

The pellets of the thermoplastic elastomer were prepared as in Example 12 except that 360 parts by weight of polyethylene glycol having the number-average molecular weight of 600, the acid value and the hydroxyl value of 0 (micro-eq/g) and 3,300 (micro-eq/g) respectively, was employed as the polyether compound (a) together with 162.5 parts of 4,4'-diphenylmethane diisocyanate having the NCO value of 8,000 (micro-eq/g). The obtained pellets were formed into 1.2 mm thick sheets and 100 micrometer thick sheets with the press molding machine (at 220° C.). The various physical properties of the sheet were mearured. The results are summarized in Table 2.

COMPARATIVE EXAMPLE 9

The pellets of the thermoplastic elastomer were prepared as in Example 12 except that 180° C. parts by weight of polyethylene glycol having the number-average molecular weight of 1,000, the acid value and the hydroxyl value of 0 (micro-eq/g) and 2,000 (micro-eq/g) respectively, was employed as the polyether compound (a) together with 120 parts of polytetramethylene glycol having the number-average molecular weight of 1,000, the acid value and the hydroxyl value of 0 (micro-eq/g) and 2,000 (micro-eq/g) respectively and 87.5 parts of 4,4'-diphenylmethane diisocyanate having the NCO value of 8,000 (micro-eq/g). The obtained pellets were formed into 1.2 mm thick sheets and 100 micrometer thick sheets with the press molding machine (at 230° C.). The various physical properties of the sheet were measured. The results are summarized in Table 2.

COMPARATIVE EXAMPLE 10

The pellets of the thermoplastic elastomer were prepared as in Example 12 except that all of the polyether compound (a), the polyester compound (b), and the poly-isocyanate compound (c) were blended simultaneously and led through the first barrel, but only as clay-like product was obtained without the thermoplastic elastomer of the present inbention obtained. The thermoplastic elastomer according to the present invention was not obtained.

TABLE 2

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| Thermoplastic elastomer | | | | | | | | | | | |
| Content of polyether component (wt %) | 65 | 64 | 65 | 65 | 73 | 55 | 63 | 64 | 73 | 54 | 61 |
| C/O ratio for polyether component | 2 | 2 | 2.4 | 2.3 | 2 | 2 | 2 | 2 | 2 | 2 | 2 |
| Glass transition temperature (° C.) | −30 | −30 | −40 | −45 | −45 | −25 | −42 | −30 | −30 | −30 | −30 |
| Physical Property of Thermoplastic elastomer | | | | | | | | | | | |
| Melting point (° C.) | 183 | 188 | 183 | 185 | 172 | 184 | 155 | 158 | 147 | 153 | 158 |
| Surface rigidity (JIS A) | 72 | 73 | 72 | 72 | 67 | 88 | 91 | 72 | 65 | 88 | 75 |
| Tensile strength (kgf/cm2) | 200 | 170 | 220 | 200 | 160 | 280 | 100 | 170 | 150 | 180 | 155 |
| Elongation (%) | 1200 | 1000 | 1300 | 1100 | 1400 | 900 | 650 | 1200 | 1400 | 1500 | 1600 |
| Permanent strain of Compression (100° C., %) | 58 | 50 | 58 | 59 | 59 | 53 | 98 | 75 | 81 | 70 | 74 |
| Moisture permeability (g/cm2/24 hr) (ASTM F372-73) | 9000 | 8500 | 7000 | 6800 | 10000 | 6000 | 10200 | 8200 | 800 | 7800 | 8600 |
| Moisture permeability (g/cm2/24 hr) (JIS Z0208) | 3700 | 3600 | 3400 | 3400 | 3800 | 3300 | 3800 | 3600 | 3600 | 3500 | 3600 |
| Yellowing value for light resistance | 4 | 5 | 5 | 2 | 4 | 3 | 4 | 3 | 5 | 4 | 3 |
| Surface rigidity for light resistance (JIS A) | 74 | 73 | 72 | 73 | 68 | 88 | 89 | 73 | 66 | 88 | 76 |
| Solubility | x | x | x | x | ○ | Δ | ○ | ○ | ○ | ○ | ○ |
| Stability | x | x | x | x | Δ | x | Δ | ○ | ○ | ○ | ○ |

| | Comparative example | | | | |
|---|---|---|---|---|---|
| | 6 | 7 | 8 | 9 | 10 |
| Thermoplastic elastomer | | | | | |
| Content of polyether component (wt %) | 29 | 62 | 58 | 62 | 62 |
| C/O ratio for polyether component | 2 | 4 | 2 | 2.8 | 2 |
| Glass transition temperature (° C.) | −20 | −50 | −10 | −47 | — |
| Physical Property of Thermoplastic elastomer | | | | | |
| Melting point (° C.) | 200 | 185 | 180 | 185 | |
| Surface rigidity (JIS A) | 98 | 75 | 80 | 75 | |
| Tensile strength (kgf/cm2) | 350 | 220 | 350 | 230 | |
| Elongation (%) | 600 | 1400 | 700 | 1350 | |
| Permanent strain of Compression (100° C., %) | 50 | 54 | 55 | 55 | |
| Moisture permeability (g/cm2/24 hr) (ASTM F372-73) | 2000 | 1000 | 2500 | 3500 | |
| Moisture permeability (g/cm2/24 hr) (JIS Z0208) | 1100 | 600 | 1400 | 1800 | |
| Yellowing value for light resistance | 25 | 30 | 25 | 28 | |
| Surface rigidity for light resistance (JIS A) | 99 | 79 | 83 | 78 | |
| Solubility | x | x | x | x | |
| Stability | x | x | x | x | |

EXAMPLE 23

The pellets of thermoplastic elastomer obtained in the example 1 were dried in an oven at 80° C. for 10 hours, and spun on the method of melt spinning by using an ordinary melt spinning machine under condition of a spinning temperature of 210° C., a spinning speed of 600 m/min, and an out-put of molten polymer of 40 g/min, obtaining an non-drawn yarn of 600 denier/10 F. The non-drawn yarn was drawn at a drawing speed of 200 m/min with a drawing ration of 3.0. Then it was passed over a heat plate of 120° C. for a heat shrinkage of 50%, finally yielding an elastomer fiber made of a thermoplastic elastomer.

A fabric having the weight of 50 g/m² was woven from an elastomer fiber mentioned hereinabove. The woven fabric was evaluated by the following testing method. The results are shown in Table 3.

Water Absorption Ratio:

The fabric was cut to a piece of 10 cm by 10 cm as a test sample, and left under an atmosphere of 50% relative humidity (RH) and at 23° C. for 24 hours. The measured weight of a test sample after leaving under an atomospere of 50% (RH) and at 23° C. for 24 hours mentioned hereinabove was assumed to the initial weight (W0). Then the test piece was soaked in distilled water at 23° C. for 10 hours. It was measured of the weight (W1) after removing the excess water by a filter paper.

Water absorption ratio (%)=W1/W0×100

Moisture-Releasing Character or Drying Time: The test piece used in the above measurement was left in an apparatus for the measurement of drying time at 23° C. under an atmosphere of 50% relative humidity, and measured of the time for drying naturally.

EXAMPLE 24

A fabric having the weight of 50 g/m² was woven using 50 weight % of the elastomer yarn made of the thermoplastic elastomer obtained in the example 23 and 50 weight % of a commercial elastomer yarn made of ether polyurethane (ESPA produced by Toyobo, 70 denier). The woven fabric was evaluated similar to the example 23. The results are shown in Table 3.

COMPARATIVE EXAMPLE 11

A fabric having the weight of 50 g/m² was woven using a commercial elastomer yarn made of ether polyurethane (ESPA; product of Toyobo in 70 denier). It was evaluated similar to the example 23. The results are shown in Table 3.

TABLE 3

|  | Water absorption ratio (%) | Drying time (min) |
| --- | --- | --- |
| Example 23 | 150 | 100 |
| Example 24 | 80 | 90 |
| Comparative example 11 | 10 | 110 |

EXAMPLE 25

An elastomer composition comprising 300 parts (wt) of polyethylene glycol, which corresponds to the polyether compound (a) having the number-average molecular weight of 1,000, the acid value and the hydroxyl value of 0 (micro-eq/g) and 2,000 (micro-eq/g) respectively, 87.5 parts of 4,4'-diphenylmethane diisocyanate, which corresponds to the poly-isocyanate compound (c) having the NCO value of 8,000 (micro-eq/g), was led into a bi-axial extruder (produced by Toshiba Machinery, L/D=58) through its first barrel, supplying at the same time 100 parts of the above-mentioned polyester (b-1) through the fifth barrel of the same extruder using the compulsory side feeder, and was molten and mixed together at 200° C. The product in pellet form was the thermoplastic elastomer of the present invention.

Production of Elastomer Film:

The obtained elastomer composition was dried at 80° C. for 8 hours, and molded through the T-die molding method at 200° C. The out-put of molten elastomer and the winding speed were adjusted so that the produced elastomer film became 30 micrometer thick. The molten elastomer was extruded between two pieces of releasing paper, and wound up to a film. The moisture permeability of the film was evaluated.

Production of Laminated Sheet:

The obtained elastomer composition was dried at 80° C. for 8 hours, and molded through the T-die molding method at 200° C. The out-put of molten elastomer and the winding speed were adjusted so that the produced elastomer film became 30 micrometer thick. The molten elastomer was extruded between a releasing paper and a non-woven fabric (Eltas E01050, product of Asahi Chemical Industries), and wound up to a laminated sheet. The moisture permeability and the water-poof property of a laminated sheet were evaluated.

EXAMPLE 26

An elastomer composition comprising 1,000 parts (wt) of polyethylene glycol, which corresponds to the polyether compound (a) having the number-average molecular weight of 1,500, the acid value and the hydroxyl value of 0 (micro-eq/g) and 1,330 (micro-eq/g) respectively, 178.5 parts of 4,47-diphenylmethane diisocyanate, which corresponds to the poly-isocyanate compound (c) having the NCO value of 8,000 (micro-eq/g), was led into a bi-axial extruder (produced by Toshiba Machinery, L/D=58) through its first barrel, supplying at the same time 100 parts of the polyester (b-1) mentioned hereinabove through the fifth barrel of the same extruder using the compulsory side feeder, and was molded into a sheet through the bi-axial extruder with a T-die of 450 mm width directly after melting and mixing together at 200° C. The out-put of molten elastomer and the winding speed were adjusted so that the produced elastomer film became 30 micrometer thick. The molten elastomer was extruded between a releasing paper and a non-woven fabric (Eltas E01050, product of Asahi Chemical Industries), and wound up to a laminated sheet. The moisture permeability and the water-poof property of the sheet were evaluated.

The physical property was evaluated as shown below.

Waterproof Property:

A test piece of the resin-laminated fabric was pot on one side of open end of a glass tube (inner diameter 40 mm, height 1,000 mm) using a sealing material. The glass tube was placed vertically on a filter paper with the side of fabric-puton surface downward. Colored water was poured into the glass tube and kept for 24 hours. Then the filter paper was checked for coloration. If not colored, the test piece was judged to have the waterproof property.

COMPARATIVE EXAMPLE 12

In the example 26, pelletization of the obtained elastomer was tried. But moldable pellets were not obtained due to stickiness of the pellets.

TABLE 4

|  | Moisture permeability g/m2/day (JIS Z 0208) | Waterproofing Property |
| --- | --- | --- |
| Example 25 (film) | 12,000 | — |
| Example 25 (laminated sheet) | 11,000 | Positive |
| Example 26 (laminated sheet) | 18,000 | Positive |
| Comparative example 12 | Not moldable | |

EXAMPLE 27

Production of Polyester (b)

A reaction system comprising 100 parts of dimethyl terephthalate, 102 parts of 1,4-butane diol, 12 parts of polytetramethylene glycol having the number-average molecular weight of 650 (product of BASF, PTHF650), 0.06 parts of tetrabutyl titanate as catalyst, 0.01 parts of 1,3,5-trimethyl-2,4,6-tris(3,5-di-t-butyl-4-hydroxybenzyl)-benzene and 0.01 parts of tris(2,4-di-t-butyl-phenyl)-phosphite as stabilizers was heated at 200° C. for 1 hour under a nitrogen atmosphere for the ester-exchange reaction. The proceeding extent of the reaction was confirmed measuring the amount of refluxing methanol. After the completion of the ester-exchange reaction, the reaction mixture was heated further to 240° C. reducing the pressure. The system was kept for 40 minutes for the polycondensation reaction, yielding finally 37 parts (wt) of the ester copolymer of white color.

Production of the Thermoplastic Elastomer Composition:

An elastomer composition comprising 100 parts of polyethylene glycol having the number-average molecular weight of 1,000 and 22 parts of 4,4'-diphenylmethane diisocyanate was led into a bi-axial extruder (produced by Belstorf Company, L/D=25), and mixed together at 200° C. (residence time 200 sec) yielding a prepolymer. Then 22 parts of the above molten ester copolymer were blended with the prepolymer mentioned hereinabove at 180° C., yielding a thermoplastic elastomer composition.

Production of Resin-Laminated Fabric:

The elastomer composition mentioned hereinabove was dried at 80° C. for several hours and was molded through the T-die molding method into a film, which was laminated with a non-woven polyester fabric (product of Asahi Chemical Industries, EstalE0015) while the molded film still remained to be thermo-adhesive. The film laminated with a non-woven polyester fabric was pressed between the laminating rolls, and wound up to a resin-laminated fabric.

The obtained resin-laminated fabric was evaluated of its moisture permeability, waterproofing property, and dewing property.

EXAMPLE 28

Production of Polyester (b):

A reaction system comprising 100 parts of dimethyl terephthalate, 102 parts of 1,4-butane diol, 0.06 parts of tetrabutyl titanate as catalyst, 0.01 parts of 1,3,5-trimethyl-2,4,6-tris(3,5-di-t-butyl-4-hydroxybenzyl)-benzene and 0.01 parts of tris(2,4-di-t-butyl-phenyl)-phosphite as stabilizers was heated at 200° C. for 1 hour under a nitrogen atmosphere for the ester-exchange reaction. The proceeding extent of the reaction was confirmed measuring the amount of refluxing methanol.

After the completion of the ester-exchange reaction, the reaction mixture was heated further to 240° C. reducing the pressure. The system was kept for 25 minutes for the polycondensation reaction, yielding finally 35 parts of the ester copolymer of white color.

Production of the Thermoplastic Elastomer Composition:

An elastomer composition comprising 100 parts of polyethylene glycol having the number-average molecular weight of 1,500 and 29 parts of 4,4'-diphenylmethane diisocyanate was led into a bi-axial extruder (produced by Belstorf Company, L/D=25), and mixed together at 200° C. yielding a prepolymer. Then 22 parts of the above molten ester copolymer were blended with the prepolymer mentioned hereinabove at 180° C. yielding a thermoplastic elastomer composition.

Production of Moisture Permeable Waterproofing Fabric:

The above elastomer composition was dried at 80° C. for several hours and was molded through the T-die molding method into a film, which was laminated with a non-woven polyurethane fabric (product of Kanebo, Espansione) while the molded film still remained to be thermo-adhesive. The film laminated with a nono-woven polyurethane fabric was pressed between the laminating rolls, and wound up to a resin-laminated fabric. The obtained resin-laminated fabric was evaluated of its properties similar to example 27. The results are shown in Table 5.

EXAMPLE 29

Production of Polyester (b)

34 parts by weight of the ester copolymer was prepared as in Example 28 except that the time for polycondensation was 40 minutes.

Production of the Thermoplastic Elastomer Composition:

An elastomer composition comprising 100 parts (wt) of polyethylene glycol having the number-average molecular weight of 1,000, 25 parts of polytetramethylene glycol, and 27 parts of 4,4'-diphenylmethane diisocyanate was led into a bi-axial extruder (produced by Belstorf Company, L/D=25); and mixed together at 200° C. (residence time 200 sec) yielding a prepolymer. Then 27 parts of the molten ester copolymer mentioned hereinabove were blended with the prepolymer mentioned hereinabove at 180° C. yielding a thermoplastic elastomer composition.

Production of Moisture Permeable Waterproof Fabric:

The above elastomer composition was dried at 80° C. for several hours and was molded through the T-die molding method into a film, which was laminated with a non-woven polyester fabric(0.29 mm thick) while the molded film still remained to be thermo-adhesive. The film laminated with a non-woven polyester fabric was pressed between the laminating rolls, and woven up to a resin-laminated fabric.

The obtained resin-laminated fabric was evaluated of its properties similar to example 27. The results are shown in Table 5.

COMPARATIVE EXAMPLE 13

The thermoplastic elastomer composition was prepared in Example 28 except that polytetramethylene glycol was employed instead of polyethylene glycol.

COMPARATIVE EXAMPLE 14

The polyester (b) was prepared as in Example 27 except that the time for polycondensation was set to 150 minutes instead of 40 minutes. But the thermoplastic elastomer composition was not obtained.

COMPARATIVE EXAMPLE 15

A commercial urethane elastomer was dried at 80° C. for several hours and was molded through the T-die molding method into a film, which was laminated with anon-woven polyester fabric of a similar type used in the example 27 while the molded film still remained to be thermo-adhesive. The film laminated with a non-woven polyester fabric was pressed between the laminiating rolls, and woven up to a resin-laminated fabric. The obtained resin-laminated fabric was evaluated of its properties similar to example 27. The results are shown in Table 5.

TABLE 5

Composition of Thermoplastic Elastomer

|  | Polyester (b) | Polyether (a) carbon/oxygen atomic Ratio | Polyether (a) Number-average Molecular weight | Polyether (a) Species | Glass transition temperature (° C.) |
|---|---|---|---|---|---|
| Example 27 | 1,000 | 2 | 1,000 | PEG | −30 |
| Example 28 | 800 | 2 | 1,500 | PEG | −35 |
| Example 29 | 1,000 | 2.4 | 1,000 | PEG/PTMG | −36 |
| Comp. Example 13 | 800 | 4 | 1,000 | PEG | −40 |
| Comp. Example 14 | 24,000 | 2 | 1,000 | PEG | — |
| Comp. Example 15 | — | — | — | — | −18 |

Performance of Moisture Permeable Waterproof Fabric

|  | Moisture permeability (g/m2/day) (ASTM F372-73) | Waterproof Property | Dewing property (g) | Moisture permeability (g/m2/day) (JIS Z0208) |
|---|---|---|---|---|
| Example 27 | 8,700 | Positive | 0.3 | 3,600 |
| Example 28 | 15,800 | Positive | 0.1 | 4,500 |
| Example 29 | 6,200 | Positive | 0.3 | 3,300 |
| Comp. Example 13 | 1,300 | Positive | 1.2 | 700 |
| Comp. Example 14 | — | — | — | — |
| Comp. Example 15 | 2,600 | Positive | 0.7 | 1,500 |

The properties of the product were measured on the following methods.

Glass Transition Temperature:

Measured according to the aforementioned method described in this patent specification.

Dewing Property:

A glass container containing water of 40° C. was covered with a test piece of the resin-laminated fabric so that its resin surface comes to inside. It was left for 1 hour in an apparatus having constant temperature and humidity that kept the temperature at 10° C. and the relative humidity at 60%. Then drops of dew attached on the surface were measured of the weight. The dewing property was determined on the weight.

EXAMPLE 30

The sheets obtained in the example 1 through 11 and the comparative examples 1 through 4 were tested for the resistance to sterilization and the ease of sterilization. The results are summarized in Table 6.

TABLE 6

|  | Example | | | | | | | | | | | Comparative Example | | | |
|---|---|---|---|---|---|---|---|---|---|---|---|---|---|---|---|
|  | 1 | 2 | 3 | 4 | 5 | 6 | 7 | 8 | 9 | 10 | 11 | 1 | 2 | 3 | 4 |
| Anti-sterilization |  |  |  |  |  |  |  |  |  |  |  |  |  |  |  |
| Tensile strength (kgf/cm2) | 180 | 165 | 210 | 190 | 145 | 275 | 90 | 145 | 130 | 170 | 140 | 345 | 200 | 325 | 200 |
| Elongation (%) | 1,100 | 1,000 | 1,200 | 1,050 | 1,200 | 900 | 600 | 1,000 | 1,800 | 1,300 | 1,450 | 550 | 1,200 | 600 | 1,200 |
| Ease of Sterilization | ○ | ○ | ○ | ○ | ○ | ○ | ○ | ○ | ○ | ○ | ○ | x | x | x | x |

Resistance to Sterilization (Anti-Sterilization):

A 2 mm thick test sheet was treated for sterilization under an atmosphere of 121° C. and high-pressured steam at a pressure (gauge) of 1atm, for 60 minutes. Then it was cooled to room temperature, and measured of the tensile characteristics by the following method.

Tensile Characteristics:

The tensile strength and tensile elongation were measured at room temperature according to the method of JIS K6301.

Ease of Sterilization:

Bacillus Stearothermophilus was cultured with Muller Hinton Broth at 35° C. for about 20 hours until the number of the bacillus reached $10^4$/ml. A drop of the solution was fallen on a filter paper of 1 $cm^2$. The filter paper was dried in the air and wrapped up with a 100 micrometer thick film achieving an airtight state. Then it was treated for high-pressured steam sterilization at 121° C., 1 atm for 20 minutes. After the sterilization, the filter paper was left on a Muller Hinton Ager and cultured at 35° C. for about 20 hours. Then the growth of the bacillus was checked. The simbol X was given on a case when the growth of the bacillus was confirmed, and the simbol O on a case not confirmed.

EXAMPLE 31

The sheets obtained in the example 1 through 7, the comparative examples 1 through 5 and the comparative example 16 were tested for the water-swelling degree per weight (%) and the modulus of elasticity at stored state/Pa (at 40° C.). The results are summarized in Table 7.

COMPARATIVE EXAMPLE 16

A commercial thermoplastic elastomer (polyurethane elastomer AM3P9029, product of Nippon Miractolan) was formed with the press molding machine(at 200° C.) into 2 mm thick sheets and 100 micrometer thick sheets. The various physical properties of the sheets were measured.

TABLE 7

|  | Water absorption ratio/ wt (%) | Modulus of elasticity at stored state (40° C.)/Pa |
| --- | --- | --- |
| Example 1 | 80 | $7.0 \times 10^6$ |
| Example 2 | 77 | $7.2 \times 10^6$ |
| Example 3 | 55 | $7.0 \times 10^6$ |
| Example 4 | 65 | $7.0 \times 10^6$ |
| Example 5 | 110 | $3.0 \times 10^6$ |
| Example 6 | 60 | $12.5 \times 10^6$ |
| Example 7 | 75 | $7.5 \times 10^6$ |
| Comp. Example 1 | 20 | $30.0 \times 10^6$ |
| Comp. Example 2 | 3 | $7.0 \times 10^6$ |
| Comp. Example 3 | 60 | $8.0 \times 10^6$ |
| Comp. Example 4 | 15 | $7.0 \times 10^6$ |
| Comp. Example 5 | Elastomer was not Obtained | |
| Comp. Example 16 | 55 | $30.0 \times 10^6$ |

The storage modulus of elasticity and water absorption ratio in Table 7 were measured under the following conditions.

Storage Modulus of Elasticity:

Apparatus: RSA-II, produced by Rheometric Scientific Co. Ltd.

Temperature range: From -100° C. to 200° C.

Rate of temperature raising: 3° C./min

Employed frequency: 1.61 Hz

Distortion: 0.05%

Water Absorption Ratio for the Thermoplastic Elastomer:

① A test sheet (50 mm×50 mm×1 mm) was completely dried in a desiccator with desiccant (silica gel). Then it was measured of the initial weight (W0).

② The test sheet was soaked in ion-exchanged water at 23° C. for 24 hours. Then it was measured of the weight (W1).

③ Water absorption ratio=(W1−W0)/W0×100 (weight %).

EXAMPLE 32

A reaction system comprising 100 parts (wt) of dimethyl terephthalate, 102 parts of 1,4-butane diol, 12 parts of polytetramethylene glycol having the number-average molecular weight of 650 (product of BASF, PTHF650), 0.3 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 200° C. for 3 hours under a nitrogen atmosphere for the ester-exchange reaction. The proceeding extent of the reaction was confirmed measuring the amount of refluxing methanol. After the completion of the ester-exchange reaction, the reaction mixture was heated under reducing condition of the pressure. The polymerization system reached less than 2 mmHg at 240° C. in 20 minutes. As the result, 120 parts (wt) of the polyester component (S) having the number-average molecular weight of 1,500 and white color were obtained.

A composition comprising 177.8 parts (wt) of polytetramethylene glycol having the number-average molecular weight of 1,000 (product of BASF, PTHF1000 and the glass transition temperature of -56° C.) as the polymeric component (T) and 55.6 parts of 4,4'-diphenylmethane diisocyanate was led into a bi-axial extruder (produced by Belstorf Company), and mixed together at 150° C. (residence time 200 sec). Then 100 parts of the polyester component (S) mentioned hereinabove were put into the extruder from its side feeder for the blending at 205° C. (residence time 200 sec) yielding pellets of the ester thermoplastic elastomer. The pellets were formed into 2 mm thick sheets through the press molding machine(at 230° C.), and various physical properties of the sheets were measured. The results are summarized in Table 11.

EXAMPLE 33

A reaction system comprising 100 parts (wt) of dimethyl terephthalate, 102 parts of 1,4-butane diol, 0.25 parts of tetrabutyl titanate as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 200° C. for 3 hours under a nitrogen atmosphere for the ester-exchange reaction. The proceeding extent of the reaction was confirmed measuring the amount of refluxing methanol. After the completion of the ester-exchange reaction, the reaction mixture was heated under reduced pressure. The polymerization system reached less than 5 mmHg at 240° C. in 20 minutes. As the result, 120 parts (wt) of the polyester component (S) having the number-average molecular weight of 1,200 and white color were obtained.

A composition comprising 562.5 parts (wt) of poly-1,2-propylene glycol having the number-average molecular weight of 3,000 (product of Mitsui Chemical, PPG3000 and the glass transition temperature of -54° C.) as the polymeric component (T) and 62.5 parts of 4,4'-diphenylmethane diisocyanate was led into a bi-axial extruder (produced by Belstorf Company), and mixed together at 150° C. (residence time 200 sec). Then 100 parts of the polyester component (S) mentioned hereinabove were put into the extruder from its side feeder for the blending at 210° C. (residence time 200 sec), yielding pellets of the ester thermoplastic elastomer. The pellets were formed into 2 mm thick sheets through the press molding machine(at 230° C.), and various physical properties of the sheets were measured. The results are summarized in Table 11.

COMPARATIVE EXAMPLE 21

A composition comprising 100 part (wt) of the polyester component (S) employed in the example 33 and 562.5 parts of poly-1,2-propylene glycol having the number-average molecular weight of 3,000 (product of Mitsui Chemical, PPG3000 and the glass transition temperature of −54° C.) was led into a bi-axial extruder (produced by Belstorf Company) and molten at 150° C. (residence time 200 sec). Then 62.5 parts of 4,4'-diphenylmethane diisocyanate were led into the bi-axial extruder by pressurization and mixed together at 210° C. (residence time 400 sec). But the thermoplastic elastomer was not obtained.

TABLE 11

| | | Example 32 | Example 33 | Comp. Example 21 |
|---|---|---|---|---|
| Glass transition temperature Tg (° C.) | | −48 | −44 | — |
| Melting point (° C.) | | 202 | 191 | — |
| Surface rigidity (JIS A) | | 84 | 69 | — |
| Modulus of tensile | 23° C. | 19.4 | 3.5 | — |
| elasticity (E') | 150° C. | 9.9 | 1.2 | — |
| $10^6$ Pa | | | | |
| Tensile Characteristics | Tensile strength kgf/cm2 | 310 | 280 | — |
| | Elongation % | 1,400 | 1,600 | — |
| Permanent compression strain (100° C.) % | | 61 | 68 | — |

Because the thermoplastic elastomer was not obtained, the columns for this comparative example 21 in Table 11 are vacant.

A reaction system comprising 128 parts (wt) of hexamethylene diamine, 146 parts of adipic acid, 0.3 parts of phosphoric acid as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 260° C. for 20 minutes under a nitrogen atmosphere for the polycondensation reaction, yielding 238 parts of the polyamide component (P) having the number-average molecular weight of 1,500 and white color.

A composition comprising 177.8 part (wt) of the polytetramethylene glycol having the number-average molecular weight of 1,000 (product of BASF, PTHF1000 and the glass transition temperature of −56° C.) as the polymeric component (T) and 55.6 parts of 4,4'-diphenylmethane diisocyanate was led into a bi-axial extruder (produced by Belstorf Company) and was mixed together at 150° C. (residence time 200 sec). Then 100 parts of the polyamide component (P) mentioned hereinabove were completely molten and led into the bi-axial extruder from its side feeder and was further mixed together at 255° C. (residence time 200 sec). The product finally obtained was a pellet of the amide elastomer. The pellets were formed into 2 mm thick sheets through the press molding machine (at 260° C.), and various physical properties of the sheets were measured. The results are summarized in Table 12.

EXAMPLE 35

A reaction system comprising 100 parts of ϵ-caprolactam, 0.25 parts of phosphoric acid as catalyst, 0.3 parts of 1,3,5-trimethyl-2,4,6-tris(3,5-di-t-butyl-4-hydroxybenzyl)-benzene and 0.3 parts of tris(2,4-di-t-butyl-phenyl)-phosphite as stabilizers was heated at 200° C. for 20 minutes under a nitrogen atmosphere for the ring-opening polymerization reaction. Then an excess amount of hexamethylene diamine was added to the system heating further at 200° C. for 3 hours. After the excess hexamethylene diamine was removed by reduced pressure, 120 parts of polyamide component (P) having the number-average molecular weight of 1,200 and white color were obtained.

A composition comprising 562.5 part of the poly-1,2-propylene glycol having the number-average molecular weight of 3,000 (product of Mitsui Chemical, PPG3000) and the glass transition temperature of −54° C. as the polymeric component (T) and 62.5 parts of 4,4'-diphenylmethane diisocyanate was led into a bi-axial extruder (produced by Belstorf Company) and was mixed together at 150° C. (residence time 200 sec). Then 100 parts of the above polyamide component (P) mentioned hereinabove were completely molten and led into the bi-axial extruder from its side feeder and was further mixed together at 215° C. (residence time 200 sec). The product finally obtained was a pellet of the amide elastomer. The pellets were formed into 2 mm thick sheets through the press molding machine (at 230° C.), and various physical properties of the sheets were measured. The results are summarized in Table 12.

COMPARATIVE EXAMPLE 22

A composition comprising 100 part (wt) of the polyamide component (p) employed in the example 35 and 562.5 parts of poly-1,2-propylene glycol having the number-average molecular weight of 3,000 (product of Mitsui Chemical, PPG3000 and the glass transition temperature of −54° C.) was led into a bi-axial extruder (produced by Belstorf Company) and was molten. Then 62.5 parts of 4,4'-diphenylmethane diisocyanate were led into the bi-axial extruder by pressurization and was mixed together at 215° C. (residence time 400 sec). But the thermoplastic elastomer was not obtained.

TABLE 12

| | | Example 34 | Example 35 | Comp. example 22 |
|---|---|---|---|---|
| Glass transition temperature Tg (° C.) | | −48 | −44 | — |
| Melting point (° C.) | | 247 | 211 | — |
| Surface rigidity (JIS A) | | 83 | 67 | — |
| Modulus of tensile | 23° C. | 18.7 | 3 | — |
| elasticity (E') | 150° C. | 10.8 | 1.5 | — |
| $10^6$ Pa | | | | |
| Tensile Characteristics | Tensile strength kgf/cm2 | 380 | 320 | — |
| | Elongation % | 1,500 | 1,700 | — |
| Permanent compression strain (100° C.) % | | 58 | 63 | — |

Because the thermoplastic elastomer was not obtained, the columns for this comparative example 22 in Table 12 are vacant.

The physical properties in the Table 11 and Table 12 were measured by the following methods:

(1) Glass Transition Temperature (Tg) and the Melting Point

Measured on a DSC (differential scanning calorimeter) with a rate of temperature raising at 10° C./min.

(2) Surface Rigidity

Measured with the A-type spring at 23° C. according to the method of JIS K6301.

(3) Modulus of Tensile Elasticity (E')

Measured of the dynamic viscoelasticity spectra at 10 Hz changing the temperature, and calculated from the E' values at room temperature (23° C.) and a high temperature (150° C.).

(4) Tensile Characteristics

Measured of the tensile strength and the tensile elongation at 23° C. according to the method of JIS K6301.

(5) Permanent Compression Strain

Measured at 100° C. with 25% distortion according to the method of JIS K6301.

From these results it is apparent that the production method of the ester elastomer according to the part II (1) of the present invention comprises the composition mentioned hereinabove and facilitates production of a ester elastomer rich in the block property in its polyester component. As a result, the invention presents an ester elastomer that has excellent elasticity and mechanical properties at a high temperature simultaneously.

Also it is apparent that the production method of the amide elastomer according to the part II (3) of the present invention comprises the composition mentioned hereinabove and facilitates production of an amide elastomer rich in the block property in its polyamide component. As a result, the present invention presents an amide elastomer that has excellent elasticity and mechanical properties at a high temperature simultaneously.

INDUSTRIAL APPLICABILITY

The present invention presents a thermoplastic elastomer that exhibits high affinity to water, excellent molecular movement and superior moisture permeability. According to the present invention, it is possible to obtain a thermoplastic elastomer that exhibits high affinity to water, excellent molecular movement property, superb block property of its short-chain polyester component, and outstanding moisture permeability as well as excellent elasticity and mechanical properties at a high temperature simultaneously. Also the present invention facilitates production of a thermoplastic elastomer that has excellent solution painting characteristics by copolymerizing a short-chain polyester component. Furthermore, the present invention facilitates production of a thermoplastic elastomer that has excellent resistance to light by employing an isocyanate component comprising aliphatic group, cycloaliphatic group, or isocyanate group in which the aromatic group is not directly bonded with.

The presesnt invention presents an elastomer fiber and fabric having excellent water absorption characteristics, excellent moisture permeability made of a thermoplastic elastomer that exhibits high affinity to water and excellent molecular movement.

According to the present invention, it is possible to obtain a thermoplastic elastomer that exhibits high affinity to water, excellent molecular movement property, superb block property for its short-chain polyester component, and outstanding moisture permeability as well as excellent elasticity and mechanical properties at a high temperature simultaneously.

Films and sheets produced according to the present invention are equipped with excellent moisture permeability and water-proof property at the same time.

According to the present invention, it is possible to obtain a molded product for medical treatment, which comprises a thermoplastic elastomer having excellent flexibility, heat resistance, anti-sterilization property, and ease of steam sterilization, wherein the thermoplastic elastomer is characterized by high affinity to water, excellent molecular movement property, superb block property for its short-chain polyester component, and outstanding moisture permeability as well as excellent elasticity and mechanical properties at a high temperature simultaneously.

The present invention presents a thermoplastic elastomer that exhibits high affinity to water, excellent molecular movement and superior moisture permeability. According to the present invention, it is possible to obtain a thermoplastic elastomer that exhibits high affinity to water, excellent molecular movement property, superb block property for its short-chain polyester component, and oustanding moisture permeability as well as excellent elasticity and mechanical properties at a high temperature simultaneously.

What is claimed is:

1. A thermoplastic elastomer, which comprises, as a constituting unit, a polyether component (A) and a polyester component (B), wherein the polyether component (A) comprises poly-oxyalkylene groups ($—C_nH_{2n}O—$) having a carbon/oxygen atomic ratio in a range from 2.0 to 2.5, the polyester component (B) has a number-average molecular weight in a range from 500 to 10,000 and comprises polybutylene terephthalate in an amount of 40 to 90 weight %, the thermoplastic elastomer has a content of polyether component (A) in a range from 50 to 95 weight %, and the thermoplastic elastomer has a glass transition temperature of not more than −20° C.

2. A thermoplastic elastomer as claimed in claim 1, wherein the polyether component (A) is bonded with a poly-isocyanate component (C).

3. A thermoplastic elastomer as claimed in claim 1, wherein the polyether component (A) has a number-average molecular weight in a range from 500 to 5,000.

4. A thermoplastic elastomer as claimed in claim 1, wherein the polyether component (A) comprises a polyethylene glycol component.

5. A thermoplastic elastomer as claimed in claim 1, wherein the polyester component (B) comprises 50 to 100 weight % of a short-chain polyester component represented by the following formula (1) and 50 to 0 weight % of a long-chain polyester component represented by the following formula (2):

$$—CO—R_1—CO—O—R_2—O— \quad (1)$$

wherein $R_1$ is (i) a divalent aromatic hydrocarbon group of 6 to 12 carbon atoms and/or (ii) a divalent alkylene group of 2 to 10 carbon atoms, or a divalent cycloaliphatic hydrocarbon group of 6 to 12 carbon atoms; $R_2$ is an alkylene group of 2 to 8 carbon atoms and/or a divalent cycloaliphatic radical of 6 to 12 carbon atoms;

$$—CO—R_3—CO—O—R_4— \quad (2)$$

wherein $R_3$ is (i) a divalent aromatic hydrocarbon group of 6 to 12 carbon atoms and/or (ii) a divalent alkylene group of 2 to 10 carbon atoms or a divalent cycloaliphatic hydrocarbon group of 6 to 12 carbon atoms; $R_4$ is a repeating unit of —$R_5$—O—, and $R_5$ is an alkylene group of 2 to 8 carbon atoms.

6. A thermoplastic elastomer as claimed in claim 1, wherein the polyester component (B) comprises a dicarboxylic acid component having a molar ratio of aromatic dicarboxylic acid groups to aliphatic dicarboxylic acid groups in a range from 100:0 to 40:60.

7. A thermoplastic elastomer as claimed in claim 1, wherein the polyester component (B) comprises a diol component having a molar ratio of linear aliphatic diol groups to cycloaliphatic diol groups in a range from 100:0 to 40:60.

8. A thermoplastic elastomer as claimed in claim 2, wherein the poly-isocyanate component (C) comprises (i) an aliphatic poly-isocyanate component, (ii) a cycloaliphatic poly-isocyanate component or (iii) a poly-isocyanate component in which the isocyanate group is not directly bonded to an aromatic ring.

9. A thermoplastic elastomer as claimed in claim 2, wherein the poly-isocyanate component (C) comprises a diisocyanate component represented by the following formula (3):

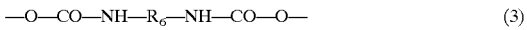

$$\text{—O—CO—NH—}R_6\text{—NH—CO—O—} \qquad (3)$$

wherein $R_6$ is an alkylene group of 2 to 15 carbon atoms, a divalent cycloaliphatic hydrocarbon group, a phenylene group, a methylene group, or a composite radical of alkylene group and phenylene group.

10. A thermoplastic elastomer, which comprises, as a constituting unit, a polyether component (A) and a polyester component (B), wherein:
  1) the thermoplastic elastomer has a water absorption ratio in a range from 50 to 200 weight %,
  2) the thermoplastic elastomer has a storage modulus of elasticity at 40° C. in a range from $1\times10^6$ Pa and $25\times10^6$ Pa,
  3) the thermoplastic elastomer has a glass transition temperature of not more than −20° C., and
  4) the polyester component (B) has a number-average molecular weight in a range from 500 to 10,000 and comprises polybutylene terephthalate in an amount of 40 to 90 weight %.

11. A thermoplastic elastomer as claimed in claim 10, wherein the polyether component (A) comprises poly-oxyalkylene groups (—$C_nH_{2n}O$—) having a carbon/oxygen atomic ratio in a range from 2.0 to 2.5, the thermoplastic elastomer has a content of polyether component (A) in a range from 50 to 95 weight %, and the thermoplastic elastomer has a glass transition temperature of not more than −20° C.

12. A method for producing a thermoplastic elastomer as claimed in claim 1 or 10, which comprises producing a prepolymer by reacting a polyether compound (a) with a poly-isocyanate compound (c), and then reacting the prepolymer with a polyester compound (b).

13. A fiber, comprising a thermoplastic elastomer as claimed in claim 1 or 10.

14. A fabric comprising a fiber as claimed in claim 13.

15. An elastomer film or sheet, comprising a thermoplastic elastomer as claimed in claim 1 or 10.

16. A method for producing an elastomer film or sheet according to claim 15, which comprises producing a prepolymer by reacting a polyether compound (a) and a poly-isocyanate compound (c), reacting the prepolymer with a polyester compound (b) to form a reaction product, and molding continuously the reaction product.

17. A moisture permeable waterproofing fabric, which is produced by laminating a fabric on at least one side of the elastomer film or sheet as claimed in claim 15.

18. A fabric, wherein at least one side of the fabric is coated with a composition containing the thermoplastic elastomer as claimed in claim 1 or 10.

19. A moisture permeable waterproofing fabric as claimed in claim 17, wherein said fabric comprises an elastomer fiber.

20. An elastomer film or sheet as claimed in claim 15, having a moisture permeability of not less than 2,000 g/m² (24 hr).

21. An article of manufacture, comprising a moisture permeable waterproofing fabric as claimed in claim 17.

22. A molded medical product, obtained by molding the thermoplastic elastomer as claimed in claim 1.

23. A moisture permeable waterproofing fabric as claimed in claim 17, having a moisture permeability not less than 2,000 g/m² (24 hr).

24. An article of manufacture as claimed in claim 21, which is a fabric, tent or shoe.

* * * * *